(12) United States Patent
Mihota

(10) Patent No.: US 6,738,578 B1
(45) Date of Patent: May 18, 2004

(54) OPTICAL COMMUNICATION METHOD AND APPARATUS

(75) Inventor: Norihito Mihota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/320,347

(22) Filed: May 26, 1999

(30) Foreign Application Priority Data

May 28, 1998 (JP) ............................................. 10-148132

(51) Int. Cl.[7] .......................... H04B 10/08; H04B 10/00
(52) U.S. Cl. ............................ 398/22; 398/35; 398/107
(58) Field of Search .................................. 359/143, 113, 359/152, 172, 145, 173; 398/22, 35, 98, 107, 137, 138, 165

(56) References Cited

U.S. PATENT DOCUMENTS

| 4,525,820 | A | * | 6/1985 | Enoki et al. | |
|---|---|---|---|---|---|
| 4,764,981 | A | * | 8/1988 | Miyahara et al. | |
| 4,882,770 | A | * | 11/1989 | Miyahira et al. | ............. 398/76 |
| 5,025,486 | A | * | 6/1991 | Klughart | |
| 5,383,046 | A | * | 1/1995 | Tomofuji | |
| 5,495,357 | A | * | 2/1996 | Osterhout | |
| 5,587,823 | A | * | 12/1996 | Yoshino et al. | |
| 5,692,127 | A | * | 11/1997 | Devon | ............. 395/200.06 |
| 5,764,395 | A | * | 6/1998 | Iwata | |
| 5,903,373 | A | * | 5/1999 | Welch et al. | ............. 398/128 |

* cited by examiner

Primary Examiner—Leslie Pascal
Assistant Examiner—Dzung Tran
(74) Attorney, Agent, or Firm—Frommer Lawrence & Haug LLP; William S. Frommer; Dennis M. Smid

(57) ABSTRACT

An optical communication system wherein a light emission circuit operates with reduced power consumption. The optical communication system is used in a communication network wherein communication is had between a control node and plural controlled nodes using light rays amplitude-modulated with carrier modulation signals over 6 MHz. The control node transmits a transmission permission signal to each controlled node, which starts or interrupts light emission with desired transient characteristics by having reference to the transmission permission signal. For example, the amplitude of the infrared light rays is increased or decreased over e.g., a period as indicated at I1.

15 Claims, 16 Drawing Sheets

OPTICAL COMMUNICATION METHOD AND APPARATUS

BACKGROUND OF THE INVENTION

1. Field of the Invention

This invention relates to an optical communication method and apparatus used in a field of radio communication employing light, such as infrared light.

2. Description of the Related Art

In the field of radio communication, employing infrared light, there is prescribed the subcarrier frequency allocation by EIAJ (Electronics Industrial Association of Japan) or IEC (International Electrotechnical Commission).

There are a wide variety of equipments for radio communication with infrared light. Most well-known are a so-called remote controller for a television receiver or a video tape recorder employing infrared light and a so-called cordless headphone for receiving music signals transmitted over a radio route from an audio player with infrared light. The subcarrier frequency range used in radio communication with infrared rays in the above-mentioned remote controller is 33 to 40 kHz, while that used in the above-mentioned music signal transmission such as by the cordless headphone is 2 to 6 MHz.

A high-speed communication network, employing infrared rays, and which is made up of a sole control node (equipment) 200 and plural control nodes 260, such as three controlled nodes 260A to 260C, as shown in FIG. 1, is envisioned, and is assumed to do time-divisionally multiplexed communication as shown in FIG. 2.

Referring to FIGS. 1 and 2, a control block B1 is used for transmitting the control information from the control node 200 to each controlled node 260. This control block B1 periodically receives signals. A given control block is separated from the next control block by plural timeslots SL (four time slots SL1 to SL4 in the example of FIG. 2). Each node transmits the transfer blocks B2 (transfer blocks B2A, B2B and B2C in the example of FIG. 2) within this time slot SL to transfer the data.

Referring to FIG. 3, a portion of the aforementioned control block B1 is used as a use permission signal (transmission permission signal) specifying the permission of use of the time slot SL. This use permission signal is sent by the control node 200 to each controlled node 260. In the example shown in FIGS. 2 and 3, the use permission signal in the control block B1 is first checked and first the controlled node 260A transfers the transfer block B2A to the control node 200. The control node 200 then transfers the transfer block B2B to the totality of the controlled nodes 260. The controlled node 260C transfers the transfer block B2C to the control node 200.

This network is in need of a broad frequency range for realization of a high-speed communication. Also, in order to assure co-existence with the above-mentioned systems, such as remote controller or cordless headphone, this network performs the communication using the subcarrier frequency not lower than 6 MHz, as shown shaded in FIG. 4.

The internal block structure of the control node 200 and the controlled node 260 is shown in FIG. 5.

In this figure, the control node 200 has a transmitter 210 and a receiver 220, while the controlled node 260 also has a transmitter 240 and a receiver 250. The transmitter 210 of the control node 200 has an orthonormal modulation circuit 211 and a light emission circuit 212 while the receiver 220 includes a light reception circuit 221 and an orthonormal demodulation circuit 222. Similarly, the transmitter 240 of the controlled node 260 has an orthonormal modulation circuit 241 and a light emission circuit 242, while the receiver 250 has a light reception circuit 251 and an orthonormal demodulation circuit 252.

The orthonormal modulation circuit 211 of the control node 200 modulates a transmission signal S201 to output a modulated signal S202 composed of frequency components not less than 6 MHz. This modulated signal S202 is inputted to the light emission circuit 212, which then amplitude-modulates the infrared rays based on the modulated signal S202. That is, the light emission circuit 212 includes a light emitting diode LED emitting infrared rays, and drives this light emitting diode LED based on the modulated signal S202. This causes the light emission circuit 212 to output the infrared rays S203 amplitude-modulated based on the modulated signal S202.

In the receiver 250 of the controlled node 260, the infrared rays S203 outputted by the control node 200 are received by the reception circuit 251. This reception circuit 251 includes a photodiode and receives the infrared rays S203 to convert the received rays into electrical signals. The reception circuit 251 also includes e.g., a high-pass filter which cuts the dc components of the electrical signals. An output signal S204 of the reception circuit 251 is inputted to the orthogonal demodulation circuit 252, which then orthogonally demodulates the signal S204 to reproduce the same reception signal S205 as the transmission signal S201.

Meanwhile, the transmitter 240 of the controlled node 260 is substantially of the same structure as the transmitter 210 of the control node 200, while the receiver 220 of the control node 200 is substantially of the same structure as the receiver 250 of the controlled node 260. That is, the orthogonal modulation circuit 241 of the controlled node 260 modulates the transmission signal S211 to output a modulated signal S212 composed of a frequency component not lower than 6 MHz. The light emission circuit 242 amplitude-modulates the infrared light based on the modulated signal S212. The light emission circuit 242 outputs the infrared rays S213 amplitude-modulated based on the modulated signal S212. The receiver 220 of the control node 200 also receives the infrared rays S213 from the controlled node 260 to convert the infrared rays into electrical signals while cutting off the dc components of the electrical signals. An output signal S214 of the reception circuit 221 then is orthogonally demodulated to regenerate the same electrical signals S215 as the transmitted signal S211.

FIG. 6 shows the amplitude (light emission intensity) of the infrared rays S203 modulated on the basis of the modulated signals S202. FIG. 6 shows the control block B1 and the transfer block B2B transmitted by the control node 200.

In the high-speed radio communication, employing infrared rays, as described above, the following problem arises in connection with the communication means for the high-speed radio communication, especially the above-mentioned transmitter.

Since the light emission circuit of the transmitter executes amplitude modulation, as discussed above, the infrared light of a pre-set constant level is perpetually outputted even in the absence of transmission signals, that is when no transmission is being preformed, as may be seen from FIG. 6. That is, since the infrared rays are being outputted in a mode of transmitting a signal only once every 1000 periods, the infrared rays are radiated wastefully for 999 periods, thus increasing the power consumption.

SUMMARY OF THE INVENTION

It is therefore an object of the present invention to provide a method and apparatus for optical communication whereby it is possible to reduce the power consumption of the light emission circuit.

In one aspect, the present invention provides an optical communication method used in a communication network in which communication is had between a control node and a plurality of controlled nodes using light rays amplitude-modulated by carrier modulation signals of a first pre-set frequency range. The communication method includes a step of transmitting a transmission permission signal from the control node to each controlled node, and a step of starting or interrupting light emission of the light rays with desired transient characteristics by each controlled node having reference to the transmission permission signal.

In another aspect, the present invention provides an optical communication apparatus used in a communication network doing communication with light rays amplitude-modulated by a carrier modulation signal of a first pre-set frequency range. The communication apparatus includes inputting means for inputting a transmission permission signal transmitted by a node connected to the communication network, and light emission control means for starting or interrupting emission of the light rays at desired transient characteristics by having reference to the transmitted transmission permission signal.

In yet another aspect, the present invention provides an optical communication apparatus used in a communication network in which communication is had between a control node and a plurality of controlled nodes using light rays amplitude-modulated by carrier modulation signals of a first pre-set frequency range. The control node at least includes transmission permission signal transmitting means for transmitting a transmission permission signal to each controlled node. Each controlled node has at least light emission control means for starting or interrupting the emission of the light rays with desired transient characteristics by having reference to the transmission permission signal.

With the optical communication method and apparatus according to the present invention, the light emitting circuit can be operated with low power consumption by the control node sending out a transmission permission signal to each controlled node and by each control node then having reference to the transmission permission signal to start or interrupt the emission of light rays with desired transient characteristics. If infrared rays are used as the light rays, the desired transient characteristics are selected so that no strong spurious will be produced in the subcarrier frequency range of 33 kHz to 6 MHz, whereby it is possible to diminish the light emission time of infrared light rays in the controlled node to decrease the power consumption of the controlled node, by selecting the desired transient characteristics so that no significant spurious will be produced in the subcarrier frequency range of 33 kHz to 6 MHz. This can be achieved as compatibility with existing systems, such as remote controllers or cordless headphone systems, is maintained. On the other hand, in short-distance communication, it is possible to diminish the power consumption of the controlled node and the control node by decreasing the output of the infrared rays and by effecting light emission on/off control instantaneously.

DESCRIPTION OF THE PREFERRED EMBODIMENTS

Figure 1:
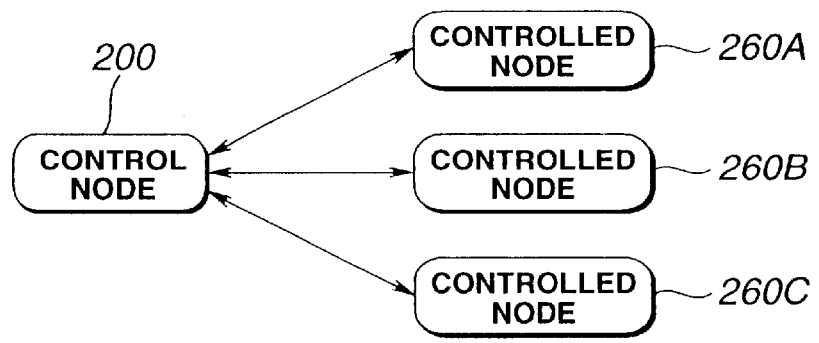
FIG. 1 shows an illustrative structure of a communication network by infrared rays employing a control node and plural controlled nodes.

Referring to the drawings, preferred embodiments of the present invention will be explained in detail.

Figure 3:
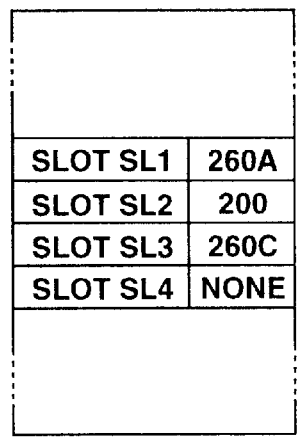
FIG. 3 shows a use permission signal for using time slots in a control block.
Figure 4:
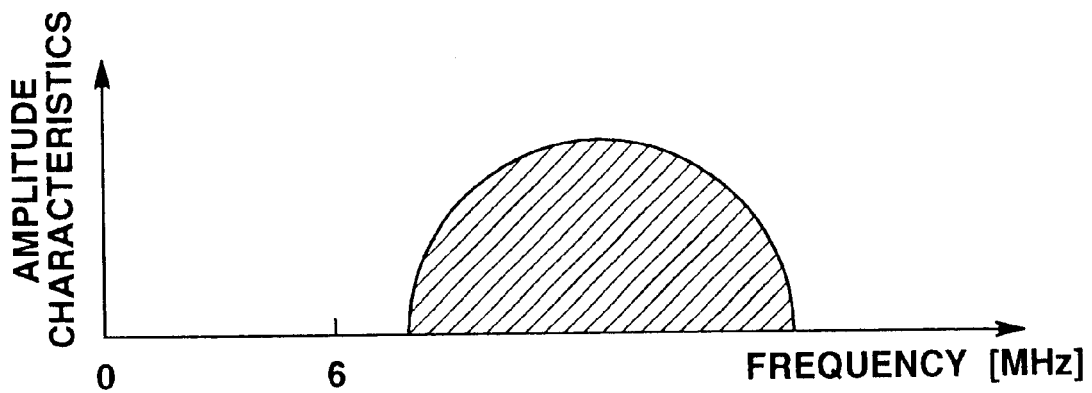
FIG. 4 shows a transmission frequency range of the communication network by infrared rays.
Figure 6:
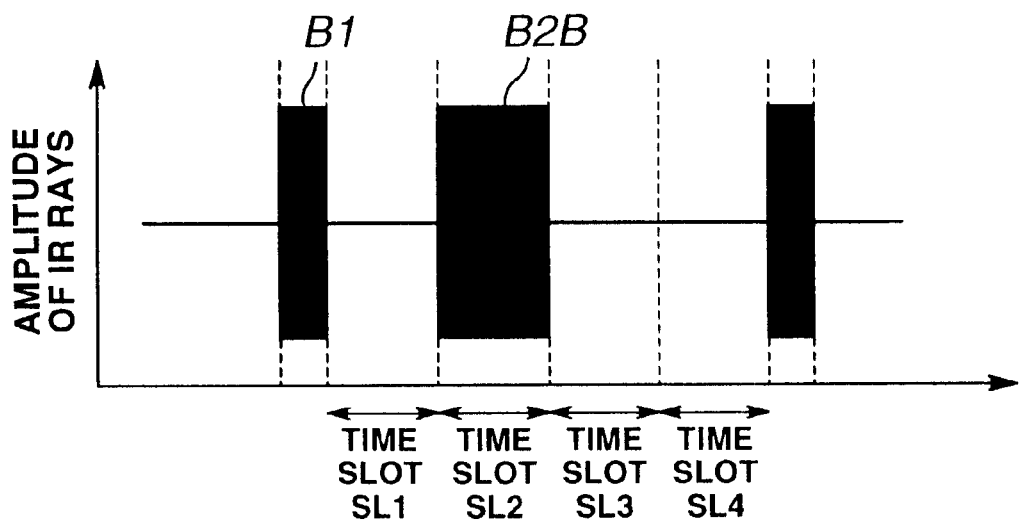
FIG. 6 shows a graph showing signal intensity of infrared rays outputted by the control node.
Figure 5:
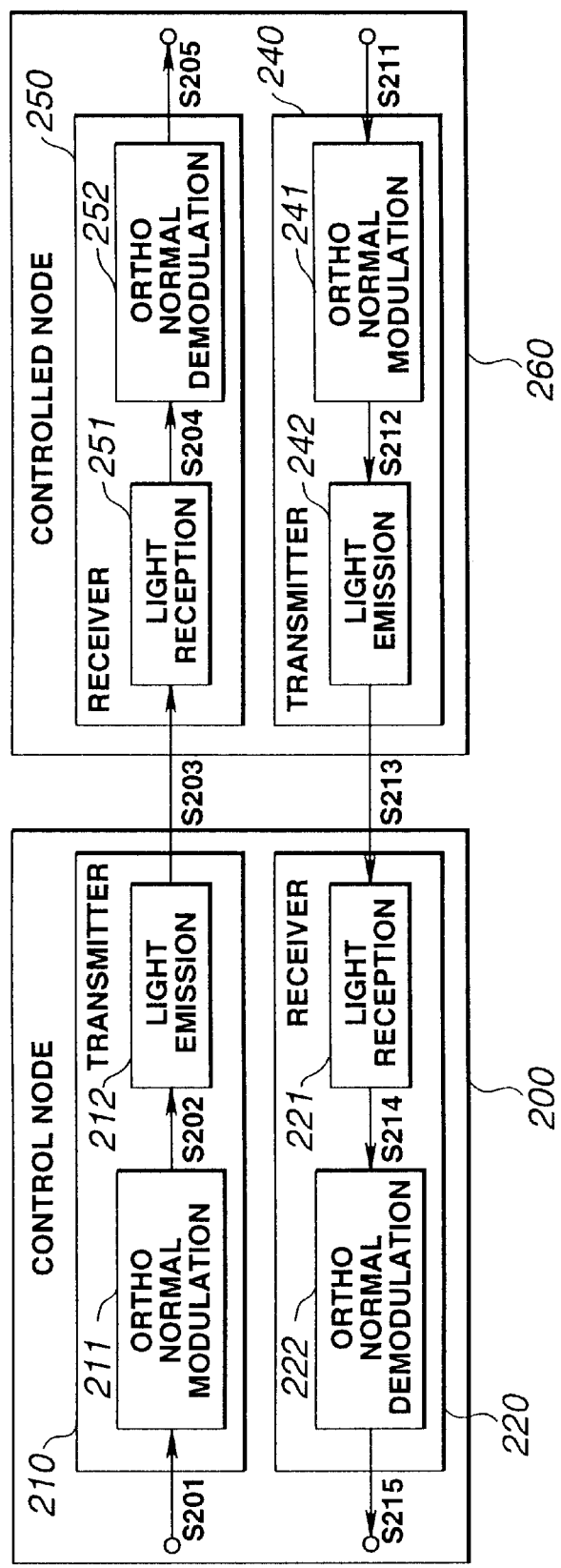
FIG. 5 shows an illustrative internal structure of the control node and the controlled nodes in the communication network.

As an embodiment of the optical communication method and apparatus according to the present invention, a high-speed radio communication network, employing infrared rays, and which is made up of a sole control node and plural controlled nodes, as explained with reference to FIG. 1, is envisioned. A specified example of the high-speed communication network used in the present embodiment will be explained subsequently. It is assumed that the high-speed radio communication network embodying the present invention performs the time-divisionally multiplexing communication as explained with reference to FIG. 2. Thus, in the present embodiment, a portion of the control block is used as a use permission signal (transmission permission signal) indicating the permission of a time slot, as explained with reference to FIG. 3. In addition, the network embodying the present invention is in need of a broad bandwidth in order to realize high-speed communication. Moreover, in order to realize the compatibility with the above-mentioned pre-existing systems, such as remote controller or cordless headphone, the subcarrier frequency exceeding 6 MHz as explained with reference to FIG. 4 is used for communication.

Figure 7:
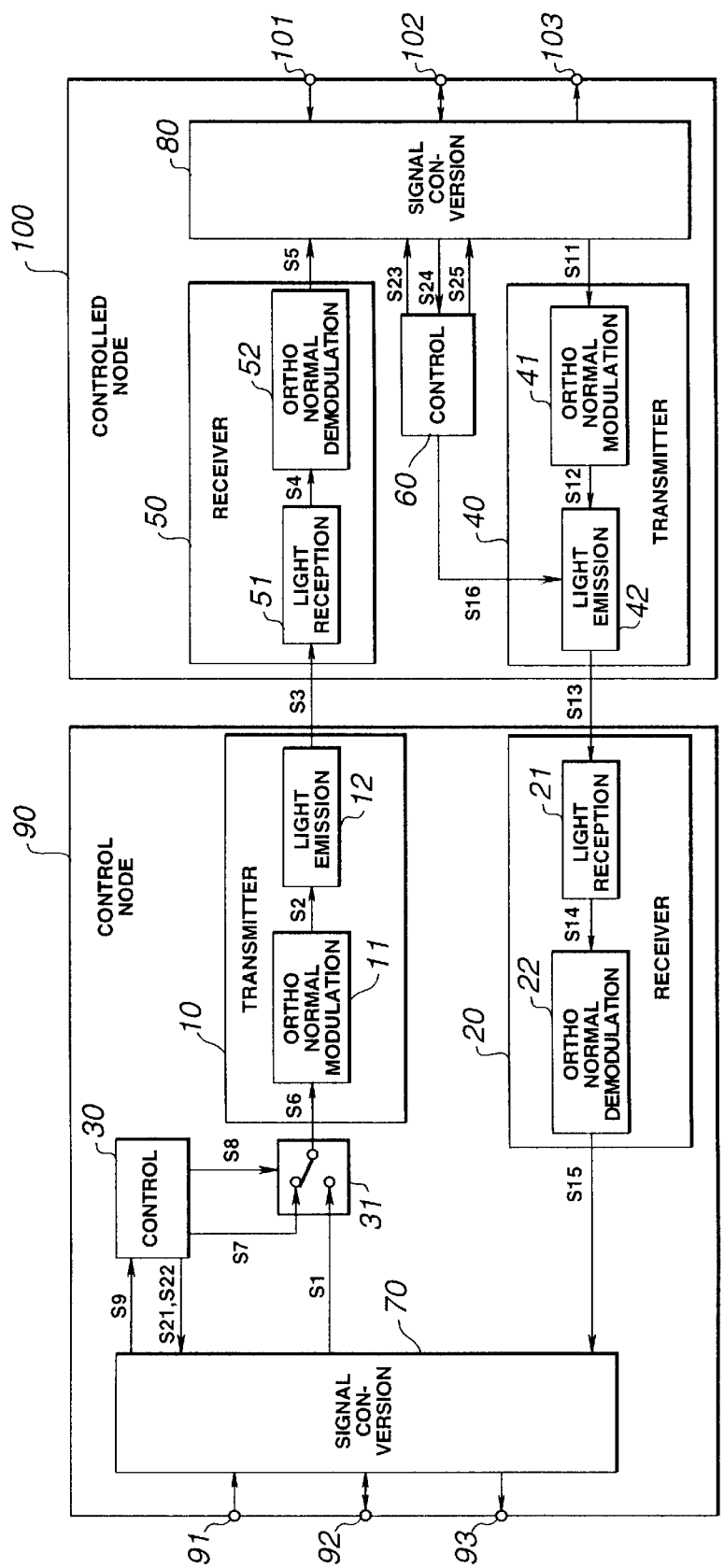
FIG. 7 is a block circuit diagram showing illustrative internal structures of the control node and the controlled nodes constituting a communication network according to a first embodiment of the present invention.

FIG. 7 shows a schematic internal block structure of a control node 90 and a controlled node 100 used in the communication network of the first embodiment of the present invention. Although FIG. 7 shows the illustrative structure for one-for-one communication comprised of a sole control node 90 and a controlled node 100 for simplicity, the present invention can, of course, be applied to one-for-plural type communication.

In FIG. 7, the control node 90 has a transmitter 10 and a receiver 20, while the controlled node 100 has a transmitter 40 and a receiver 50. The transmitter 10 of the control node 90 has an orthogonal modulation circuit 11 and a light emission circuit 12 while the receiver 20 includes a light reception circuit 21 and an orthogonal demodulation circuit 22. Similarly, the transmitter 40 of the controlled node 100 has an orthogonal modulation circuit 41 and a light emission circuit 42, while the receiver 50 has a light reception circuit 51 and an orthogonal demodulation circuit 52.

The orthogonal modulation circuit 11 of the control node 90 modulates a transmission signal S1 to output a modulated signal S2 composed of frequency components not less than 6 MHz. This modulated signal S2 is inputted to the light emission circuit 12, which then amplitude-modulates the infrared rays based on the modulated signal S2. That is, the light emission circuit 12 includes a light emitting diode LED emitting infrared rays and drives this light emitting diode LED based on the modulated signal S2. This causes the light emission circuit 12 to output the infrared rays S3 amplitude-modulated based on the modulated signal S2.

In the receiver 50 of the controlled node 100, the infrared rays S3 outputted by the control node 90 are received by the reception circuit 51. This reception circuit 51 includes a photodiode and receives the infrared rays S3 to convert the received infrared rays into electrical signals. The reception circuit 51 also includes e.g., a high-pass filter which cuts the dc components of the electrical signals. An output signal S4 of the reception circuit 51 is inputted to the orthogonal demodulation circuit 52, which then orthogonally demodulates the signal S4 to reproduce the same reception signal S5 as the transmission signal S1.

Meanwhile, the transmitter 40 of the controlled node 100 is substantially of the same structure as the transmitter 10 of the control node 90, while the receiver 20 of the control node 90 is substantially of the same structure as the receiver 50 of the controlled node 100. That is, the orthogonal modulation circuit 41 of the controlled node 100 modulates the transmission signal S11 to output a modulated signal S12 composed of a frequency component not lower than 6 MHz. The light emission circuit 42 amplitude-modulates the infrared rays based on the modulated signal S12. The light emission circuit 42 outputs the infrared rays S13 amplitude-modulated based on the modulated signal S12. The receiver 20 of the control node 90 also receives the infrared rays S13 from the controlled node 100 to convert the infrared rays into electric signals while cutting off the dc components of the electrical signals. An output signal S14 of the reception circuit 21 then is orthogonally demodulated by the orthogonal demodulation circuit 22 to regenerate the same electrical signals S15 as the transmitted signal S11.

In the present embodiment, the control node 90 includes means for transmitting the use permission signal of a time slot N periods ahead, where N is an integer not less than 1 and the period is the transmission period of the control block. That is, the control node 90 of the present embodiment transmits the use permission signal of the time slot N periods ahead using the control block.

Also, in the present embodiment, the controlled node 100 includes means for verifying whether or not emission of infrared rays is to be started or halted by having reference to the use permission signal of the time slot, and means for affording desired moderate transient properties to the on/off of light emission of the infrared rays. The speed of the on/off transition of emission of the infrared rays is selected so as not to produce serious spurious characteristics in the subcarrier frequency bandwidth of 33 kHz to 6 MHz used in the remote controller or the cordless headphone. That is, in the present embodiment, the desired moderate transient properties are selected so that the degree of amplitude changes, that is the gradient when the amplitude and time are plotted on the ordinate and on the abscise, respectively, in case of changing the infrared rays within a given time interval from zero amplitude (zero light emission intensity) to a pre-set amplitude necessary for data communication or from the pre-set amplitude to the zero amplitude, is such that no spurious is produced in the subcarrier frequency of 33 kHz to 6 MHz, that is so that the amplitude will be changed only gradually. It is noted that, if the length of M periods, where M>0, is required for on/off transition of emission of the infrared rays, the aforementioned N is selected to be not less than M.

Thus, with the network of the present embodiment, each controlled node 100 can comprehend the use permission of a time slot N periods ahead by the control node 90 transmitting a use permission signal of the time slot N periods ahead to each controlled node 100, using the control block, and by each controlled node 100 receiving this control block.

Thus, if the controlled node 100, not emitting the infrared rays at the current time point, should receive the use permission signal of the time slot N periods ahead of the current time point, the controlled node 100 starts light emission of the infrared rays, at the same time as the light emission intensity is increased. In such case, the transient characteristics are smoothed so that no spurious will be produced in the subcarrier frequency range of 33 kHz to 6 MHz, that is so that the light emission amplitude of the infrared rays will be increased progressively from the zero amplitude to the pre-set amplitude. When the time is the time slot permitted to be used by the use permission signal, the controlled node 100 effects radio communication of the transfer block by the infrared rays as described above.

Conversely, if the controlled node 100, emitting the infrared rays at the current time point, should not receive the use permission signal of the time slot N periods ahead of the current time point, that is if the controlled node 100 cannot transmit in the timeslot N periods ahead, and moreover no transfer block is transmitted until after the N periods, the controlled node 100 interrupts the emission of the infrared rays to decrease the light emission intensity. The transient properties at this time should be smoothed so that no spurious will be produced in the aforementioned frequency range of from 33 kHz to 6 MHz. In other words, the amplitude of light emission is decreased gradually from the aforementioned pre-set amplitude to the zero amplitude.

With the network of the present embodiment, employing the above-described method, the infrared light emitting time duration in the controlled node 100 can be shortened, while co-existence with the pre-existing systems, such as the remote controller or the cordless telephone, is guaranteed, for realizing low power consumption in the controlled node 100.

Figure 8:
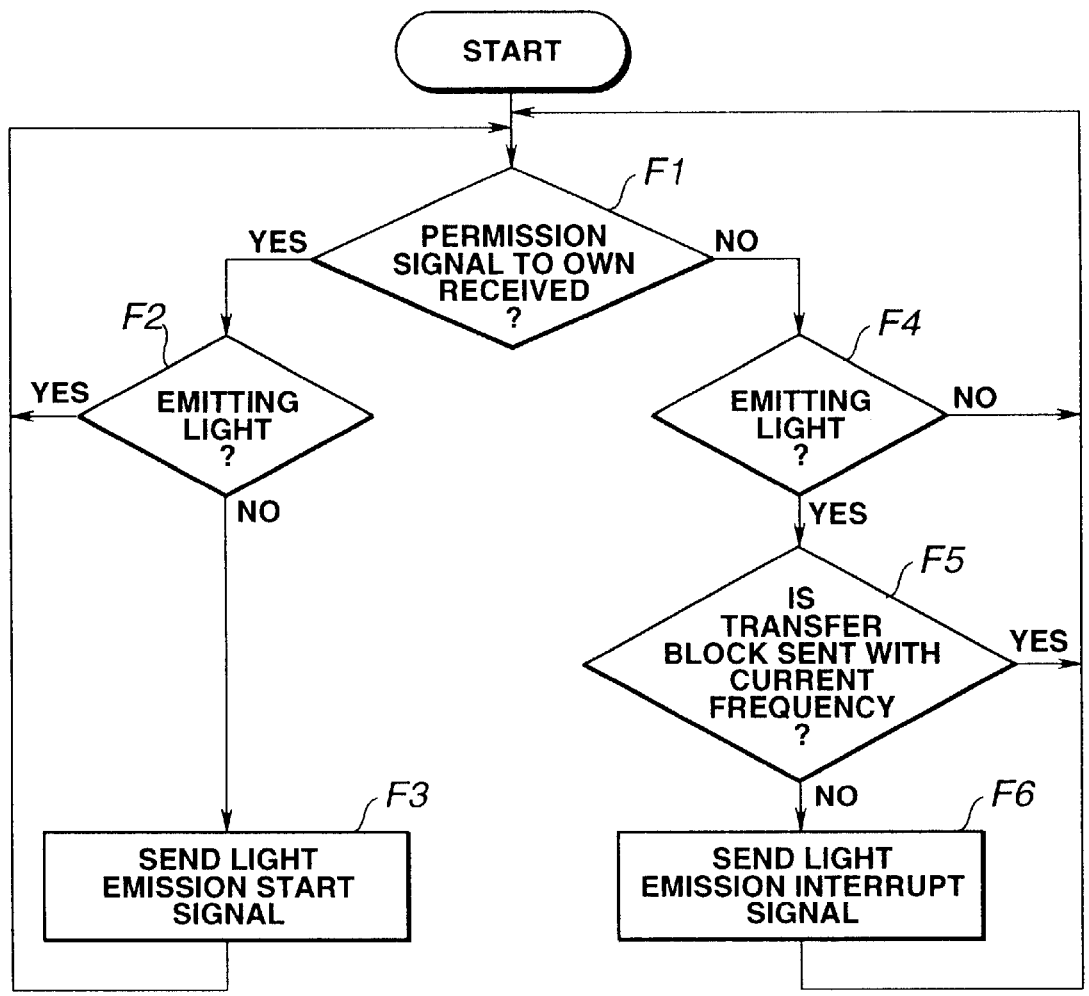
FIG. 8 is a flowchart for illustrating the operation of a controller of the controlled node.
Figure 9:
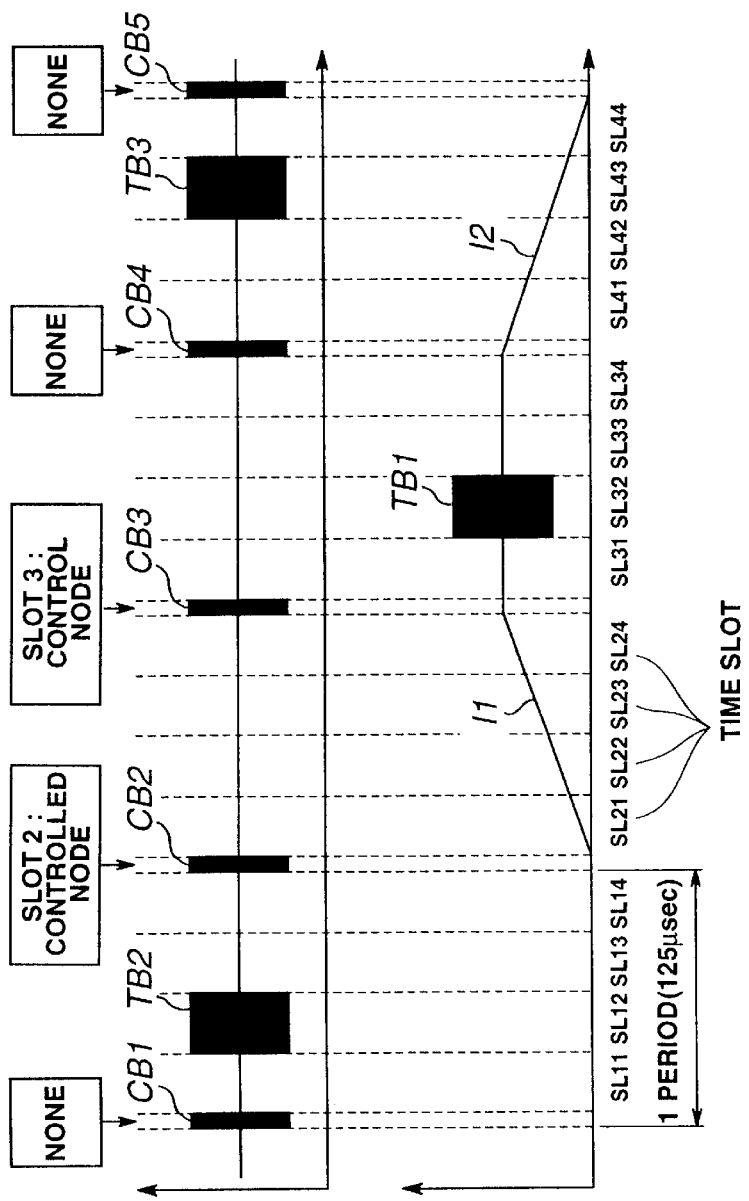
FIG. 9 shows the amplitudes of the infrared rays outputted by the control node and those of the infrared rays outputted by the controlled nodes in case of progressively increasing or decreasing the amount of emission of the infrared light.

FIGS. 7 to 9 illustrate the specified structure and the operation for realization of low power consumption of the controlled node 100.

Referring to FIG. 7, the control node 90 includes, in addition to the transmitter 10 and the receiver 20, a controller 30 and a switch 31 as means for transmitting a use permission signal of the time slot N periods ahead. The control node 90 also includes a signal conversion circuit 70 as later explained. The controlled node 100 includes, in addition to the transmitter 40 and the receiver 50, means for discriminating whether or not light emission of the infrared rays is to be started or interrupted, by having reference to the use permission signal for the timeslot, a controller 60 and a light emission circuit 42 as means for effecting the on/off operation of light emission of the infrared rays with desired moderate transient properties, and a signal conversion circuit 80, as later explained. The signal conversion circuits 70, 80 will be explained subsequently.

The controller 30 of the control node 90 allocates the time slot N periods ahead, for example, one period in the present embodiment, in accordance with a command S9 from an upper layer, to formulate the use permission signal S7, which is supplied to one a of fixed terminals of the switch 31. Although time slot allocation here is made in accordance with the command S9 from the upper layer etc, a counter or a storage device may be provided in the inside of the controller 30 so that the controller 30 using these will operate autonomously to generate the use permission signal.

The switch 31 is configured so that the usual transfer block or the control block from the signal conversion circuit 70 as later explained is routed as a signal S1 to the the fixed terminal b. The switch 31 has its movable terminal moved between the fixed terminals a and b in accordance with the control signal S8 from the controller 30.

That is, the controller 30 controls the switch 31 by the control signal S8 to move the movable contact towards the fixed contact b to send the signal S1 of the transfer block directly to the transmitter 10 as signal S6 if the block is the usual transfer block. If the block is the control block, the controller 30 controls the switching between the fixed terminals a and b by the control signal S8 so that the use permission signal S7 will be introduced as a portion of the control block. Thus, there is generated in the signal S1 of the control block a signal S6 into a portion of which is inserted the use permission signal S7, as shown in FIG. 3. The use permission signal S7, thus inserted into the control block, specifies the permission to use the time slot N periods ahead.

On the other hand, the controller 60 of the controlled node 100 receives the control block taken out by the signal conversion circuit 80 as later explained from the reception signal S5 and refers to the use permission signal present in the control block to generate the control signal S16 used for controlling the light emission circuit 42. The controller 60 is able to know the using condition of the time slot N periods ahead based on the use permission signal of the control block. The light emission circuit 42 of the controlled node 100 has the functions of progressively increasing the light emission of the infrared light from the zero amplitude to the pre-set amplitude, in accordance with the moderate transient characteristics, based on the control signal S16 supplied from the controller 60, and of progressively decreasing the light emission of the infrared light from the pre-set amplitude to the zero amplitude in accordance with the above-mentioned moderate transient characteristics.

FIG. 8 shows the operational flow in the controller 60 of the controlled node 100.

Referring to FIG. 8, it is first checked at step F1 whether or not there is the use permission signal for the controlled node 100 in the control block. If, at this step F1, the use permission signal is verified to be present in the control block (YES), the program moves to the processing at step F2. If otherwise (NO), the program moves to the processing at step F4.

At step F2, to which the program proceeds if there is the use permission signal in the control block, it is checked whether or not the light emission circuit 42 is emitting light at the current time point. If, at this step F2, the light emission circuit 42 is verified not to be emitting the light (NO), the program moves to step F3. If the light emission circuit 42 is verified to be emitting the light (YES), the program moves to the processing of step F1 without doing any processing.

At step F3, to which the program moves if the light emission circuit 42 is not emitting the light, a command for initiating the emission of the infrared light is issued by the control signal S16 to the light emission circuit 42. This causes the light emission circuit 42 to emit the light to increase the light emission intensity with the aforementioned desired moderate transient characteristics. When the time is the time slot use-permitted by the use permission signal, the light emission intensity of the light emission circuit 42 is equal to the pre-set amplitude necessary for the aforementioned data transmission, thus enabling the radio transmission of the transfer block by the infrared light. After the processing of the step F3, the program moves to the processing at step F1.

At step F4, to which the program moves in the absence of the use permission signal in the control block, it is checked whether or not the light emission circuit 42 is emitting the infrared light at the current time point, as at step F2. If it is found at step F4 that the light emission circuit 42 is not emitting the light (NO), the program reverts to step F1, without doing any processing. If it is found that the light emission circuit 42 is emitting the light (YES), the program moves to the processing of step F5.

At step F5, it is verified whether or not the control node 100 is to transmit the transfer block with the period of the current time point. If it is found that transmission is to be made (YES), the program reverts to the processing of step S1. If otherwise, the program moves to the processing at step F6.

At step F6, a command for interrupting the emission of the infrared light is issued by the control signal S16 to the light emission circuit 42. Thus, the light emission circuit 42 decreases the light emission intensity gradually in accordance with the aforementioned desired moderate transient characteristics until the light emission intensity is ultimately zero(zero amplitude). After this step F6, the program reverts to the processing of step F1.

FIG. 9 shows the relation between the start of infrared light emission and interruption by the use permission signal and the time slot in the present embodiment and the state of increased or decreased light emission intensity with the above-mentioned desired moderate transient characteristics. The operation of the structure of FIG. 7 is explained by referring to this FIG. 9 and also to FIG. 8. Specifically, FIG. 9A shows the presence or absence of the use permission signal in a control block, while FIGS. 9B and 9C show the amplitude of the infrared light outputted by the control node and that emitted by the controlled node 100, respectively. In FIG. 9, CB and TB represent the control block and the transfer block respectively. In FIG. 9, the use permission signal of the time slot SL contained in each control block CB are entered above each control block CB. In the present embodiment, the period of the control block CB is 125 μsec, and the time corresponding to the aforementioned desired moderate transient characteristics (time until the amplitude changes from zero amplitude to a pre-set amplitude or that until the amplitude changes from the pre-set amplitude to zero amplitude) is 125 μsec corresponding to one period.

First, the controlled node 100 receives the control block CB1. Since there is no use permission signal at this time for the controlled node 100, as shown in FIG. 9A, the result of check at step F1 is NO, so that the program moves to step F4. Also, since the light is not emitted at the current time point, the result of check at step F4 is NO, so that the program reverts to step F1. Thus, the controlled node 100 maintains the status quo without emitting infrared rays.

The controlled node 100 then receives the control block CB2. Since there is now the use permission signal for the controlled node 100, as shown in FIG. 9A, the result of check at step F1 is YES, so that the program moves to step F2. Meanwhile, the use permission signal at this time specifies the use permission for the second slot, so that the slot actually used by the control node 100 is the slot s132 in FIG. 9C. Also, since the light is not emitted at this time, the result of check at step F2 is NO, and the program moves to step F3. At this step F3, a control signal S16 commanding the start of light emission of the infrared rays is sent to the light emission circuit 42.

On reception of the control signal S16 commanding the start of light emission, the light emission circuit 42 causes the amplitude of the infrared light to be increased gradually over approximately one period time, as shown at I1 in FIG. 9C.

The controlled node 100 then receives the control block CB3. Since there is no use permission signal for the controlled node 100, as shown in FIG. 9A, the result of check at step F1 is NO. Thus, the program moves to step F4. Since the infrared light is already emitted at the current time point, the result of check at step F4 is YES, so that the program moves to step F5. At this step F5, it is checked whether or not the transfer block is to be transmitted at the current period. Since here the transfer block is transmitted at the second time slot (SL32) of the period in question, the result of check is YES, so that the program returns to step F1. Thus, the control node 100 maintains the status quo to continue to emit the infrared light. When the time is the second time slot SL32, the controlled node 200 transmits the transfer block TB1.

The controlled node 100 then receives the control block CB4. Since there lacks the use permission signal for the controlled node 100 at this time, as shown in FIG. 9A, the result of check at step F1 is NO. Thus, the program moves to step F4. Since the infrared light is already emitted at this time point, the result of check at step F4 is YES, such that the program moves to step F5. At this step F5, it is verified whether or not the transfer block is to be transmitted at the current period. Since transmission is not made by the controlled node 100 at the period in question, the result of check is NO, such that the program moves to step F6. At step F6, the control signal S16 commanding the interruption of light emission of the infrared light is sent to the light emission circuit 42. On reception of the control signal S16 commanding the interruption of the light emission, the light emission circuit 42 gradually decreases the amplitude of the infrared rays over approximately one period, as shown at I2 in FIG. 9C.

With the network of the first embodiment of the present invention, the power consumption is decreased by reducing the emitting time of the infrared rays by the controlled node having the smaller chance of signal transmission for thereby decreasing the power consumption.

In the above-described first embodiment, control is performed so that the light emission of the infrared light by the controlled node 100 will be gradually changed from the zero amplitude to the pre-set amplitude or from the pre-set amplitude to the zero amplitude in accordance with moderate transient characteristics. Alternatively, control may be so performed that emission of the infrared light will be of desired steep transient characteristics not only in the controlled node 100 but also in the control node 90, as in the second embodiment hereinafter explained. If the steep transient characteristics are used, power consumption may be lower than in the first embodiment.

Figure 10:
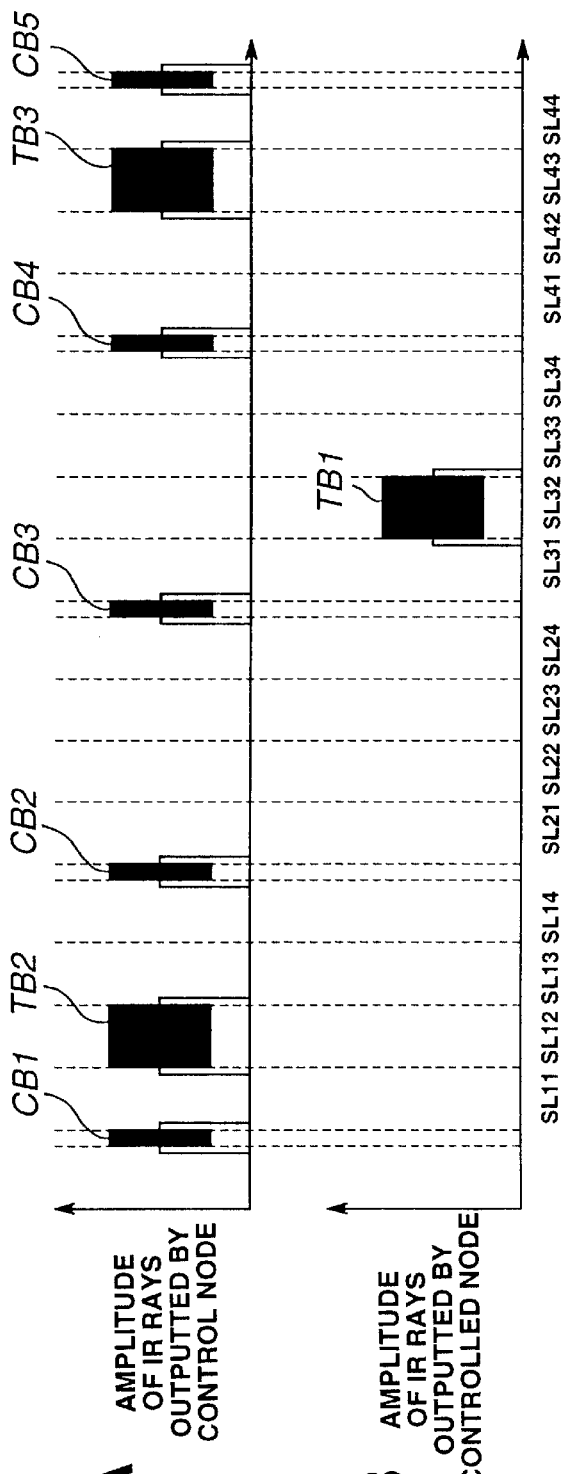
FIG. 10 shows the amplitudes of the infrared rays outputted by the control node and those of the infrared rays emitted by the control node in case of acutely increasing or decreasing the amount of emission of infrared rays in the second embodiment.

Specifically, in the second embodiment of the present invention, the amplitude of the infrared rays is increased from a pre-set amplitude value to the zero amplitude with acute transient characteristics directly before transmitting the signals, for both the control node 90 and the controlled node 100, with the amplitude of the infrared light being decreased with acute transient characteristics from the pre-set amplitude value to the zero amplitude directly after the end of signal transmission, as shown in FIG. 10, thus further decreasing the power consumption for both the control node 90 and the controlled node 100. Meanwhile, FIG. 10a corresponds to FIG. 9B, while FIG. 10b corresponds to FIG. 9C. Thus, although not shown in FIG. 10, the use permission signal in the control block corresponds to FIG. 9A.

However, if the emission of the infrared light is turned on/off using acute transient characteristics, as in the present second embodiment, there is a risk of the spurious being generated in the subcarrier frequency range of 33 kHz to 6 MHz to render compatibility with the remote controller or the cordless headphone difficult. Thus, if the acute transient characteristics as in the second embodiment are used, the light emitting intensity of the infrared light itself is decreased and the communication is limited to the radio communication over a short distance to minimize the effect on and assure co-existence with e.g, the remote controller.

Figure 11:
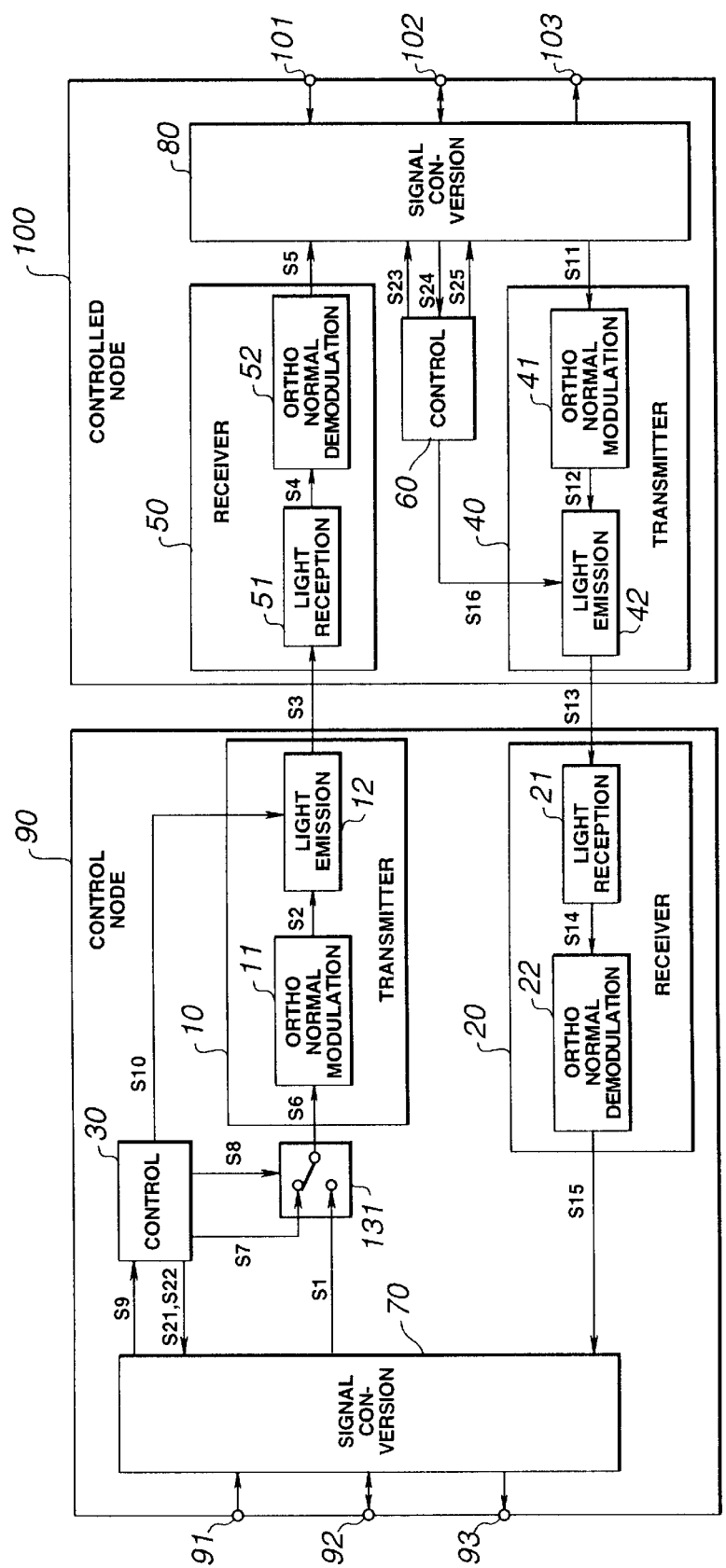
FIG. 11 is a block circuit diagram showing illustrative internal structures of the control node and the controlled nodes making up the communication network of the second embodiment of the present invention.

FIG. 11 schematically shows the internal block structure of the control node 90 and the controlled node 100 used in the communication network according to the second embodiment of the present invention. Since the constituent elements of FIG. 11 are basically the same as those shown in FIG. 7, the description on the operation is not made and only parts or components different from those shown in FIG. 7 are explained.

In the second embodiment, shown in FIG. 11, light emission control is performed in the control node as well, so that the controller 30 of the control node 90 performs on/off control of light emission in the light emission circuit 12 using the control signal S10. Therefore, the light emission circuit 12 internally has the function of starting or interrupting the light emission of the infrared light with the aforementioned acute transient characteristics.

The same holds for the light emission circuit 42 of the controlled node 100. The light emission circuit 42 internally has the function of starting or interrupting the emission of the infrared rays with the aforementioned acute transient characteristics.

With the present second embodiment, since not only the emission time duration of the infrared light of the controlled node 100 but also that of the control node 90 can be shortened, the power consumption in its entirety can be reduced more significantly than in the first embodiment.

In the above explanation, the first embodiment and the second embodiment are configured differently from each other. Alternatively, the functions of the first and second embodiments can be realized simultaneously. That is, the functions of the first embodiment and those of the second embodiment may be used in a switching fashion for long-distance radio communication and for short-distance radio communication, respectively. If the functions of the first embodiment are used for long-distance radio communication, subcarrier frequency range allocation can be observed with respect to e.g., the remote controller, while the power consumption of the controlled node can be reduced. On the other hand, if the functions of the second embodiment are used for short-distance radio communication, the power consumption can be reduced in both the control node 90 and the controlled node 100.

It is noted that switching between these two functions can be done manually or automatically. That is, the light reception level of the infrared rays is decreased with the communication distance, the latter can be estimated from the reception level if the light emission level on the counterpart party is known. The result is that automatic function switching is possible based on this communication distance.

Figure 12:
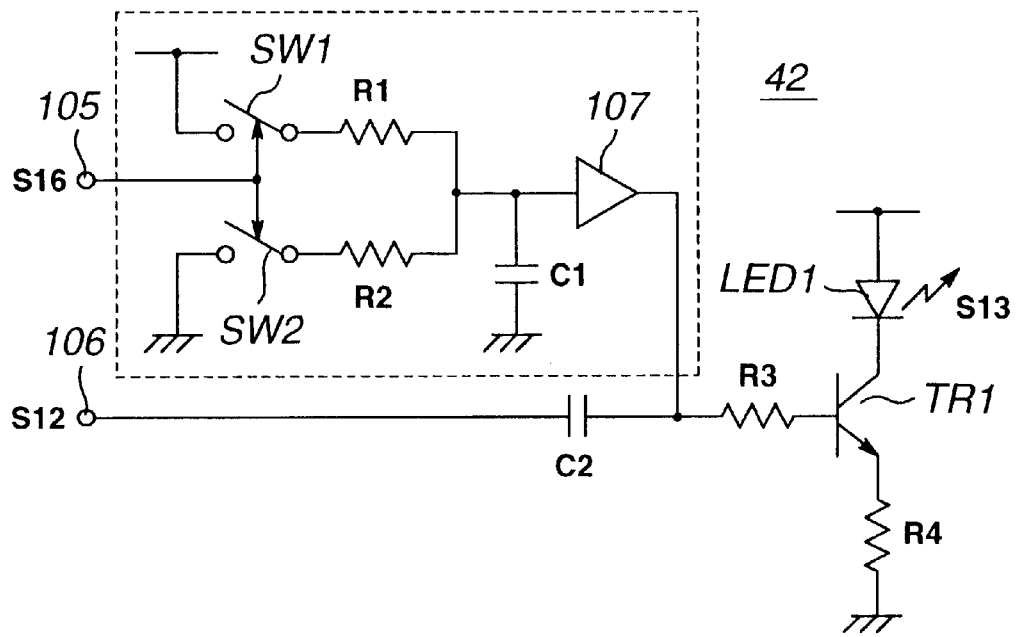
FIG. 12 is a circuit diagram showing a specified illustrative structure of a light emission circuit in each of the embodiments of the present invention.
Figure 13:
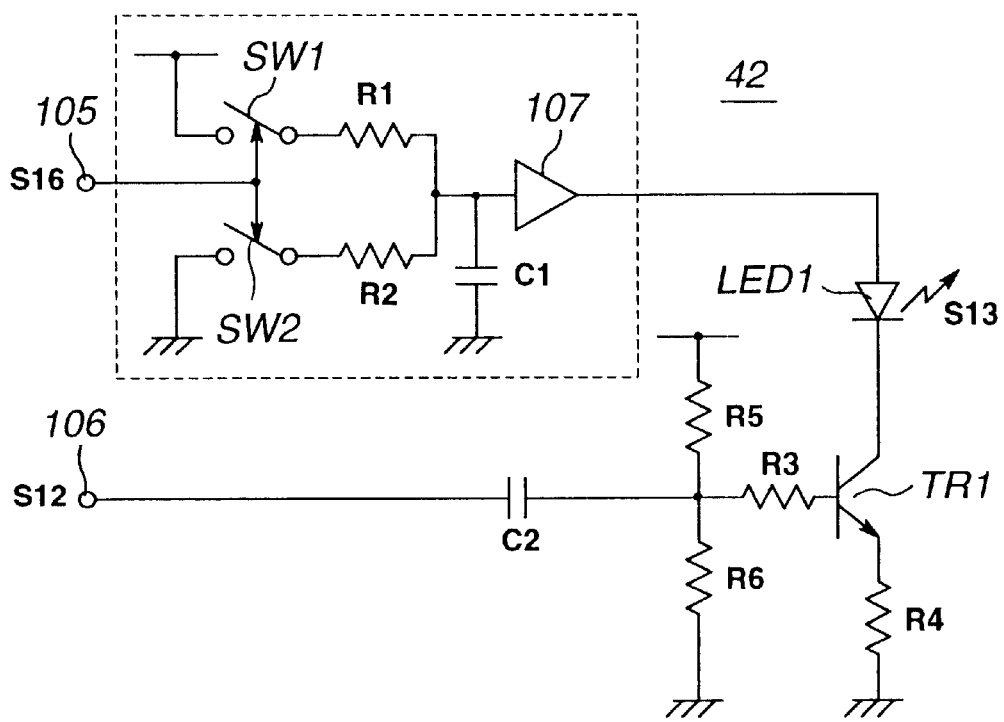
FIG. 13 is a circuit diagram showing a specified illustrative structure of a light emission circuit of each of the embodiments of the present invention.

Referring to FIGS. 12 and 13, a specified structure for representing the light emission control in each embodiment of the present invention described above is explained. It is noted that FIGS. 12 and 13 show the illustrative structure of the light emission circuit 42 of the controlled node 100, and that the above-described second embodiment can be applied to the light emission circuit 12 of the control node 90.

Referring to FIG. 12, the above-mentioned control signal S16 is supplied from the controller 60 of the controlled node 100 to the terminal 105, while the modulated signal S12 from the orthogonal modulation circuit 41 of the controlled node 100 are sent to the terminal 106.

The control signal S16 is the switching control signal for the switches SW1, SW2. It is noted that, if the control signal S16 commands start of light emission, the switches SW1, SW2 are turned on and off, respectively, whereas, if if the control signal S16 commands start of light interruption, the switches SW1, SW2 are turned off and on, respectively.

The switch SW1 has its one end connected to a constant voltage source, while having its other end connected to an input end of an amplifier 107 via a time constant circuit made up of a resistor R1 and a capacitor C1. The switch SW2 has its one end grounded, while having its other end connected to the input end of an amplifier 107 via a time constant circuit made up of a resistor R2 and a capacitor C1.

The amplifier 107 has its output end connected via a resistor R3 to the base terminal of an NPN transistor TR1. The transistor TR1 has its collector terminal connected to a cathode end of a light emitting diode LED 1, while having its emitter terminal grounded via a resistor R4.

Thus, in the light emission circuit 42, configured as shown in FIG. 12, if the start of emission of the infrared light is commanded by the control signal S16 to turn the switches SW1 and SW2 on and off, respectively, the voltage at an input end of the amplifier 107 is increased from the zero level to a pre-set level, in accordance with the time constant determined by the resistor R1 and the capacitor C1, as a result of which the light emission intensity of the light emitting diode LED1 is increased. On the other hand, if the interruption of emission of the infrared light is commanded by the control signal S16 to turn the switches SW1 and SW2 off and on, respectively, the voltage at an input end of the amplifier 107 is decreased from the pre-set level to the zero level, in accordance with the time constant determined by the resistor R2 and the capacitor C1, as a result of which the light emission intensity of the light emitting diode LED is decreased.

In the embodiment of FIG. 12, the time constant determined by the resistor R1 and the capacitor C1 and the time constant determined by the resistor R2 and the capacitor C1 govern the desired moderate or acute transient characteristics in the above-described embodiments. Stated differently, if the moderate transient characteristics are to be achieved, the values of the resistor R1 and the capacitor C1 are determined so as to realize a long time constant, whereas, if the above-mentioned transient characteristics are to be achieved, the values of the resistor R2 and the capacitor C1 are determined so as to realize a short time constant.

In the above-described embodiments, the resistors R1 and R2 are of the same values, as may be seen from FIGS. 9 and 10. However, these resistance values may be selected to different values. If the resistance values are selected to different values, the transient characteristics when the light emission amplitude is increased may be different from those when the light emission amplitude is decreased. The resistors R1 and R2 may be configured as variable resistors. If these resistors R1 and R2 are variable resistors, and the resistance values are changed in an equal amount simultaneously, it is possible to switch the functions of the first and second embodiments.

On the other hand, the modulated signal S12 are supplied via the capacitor C2 for removal of dc components and the resistor R3 to the base terminal of the NPN transistor TR1. Thus, if the modulated signals S12 are entered to a terminal 106, the transistor TR1 is driven in keeping with the modulation signals S12 to realize signal transmission from the light emitting diode LED1 by the infrared light S13.

In the light emission circuit 42, shown in FIG. 13, the terminals 105, 106, switches SW1, SW2, capacitors C1, C2, amplifier 107, resistors R1 to R4, transistor TR1 and the light emitting diode LED1 are the same as those shown in FIG. 12. In the present embodiment, shown in FIG. 13, voltage-dividing resistors R5 and R6 are provided across the capacitor C2 and the resistor R3, with the output end of the amplifier 107 being connected to the anodic end of the light emitting diode LED1. Although the explanation is omitted for avoiding redundancy, the configuration of FIG. 13 operates in the same way as that shown in FIG. 12.

The configuration and the operation of the signal conversion circuits 70 and 80 in the above-described respective embodiments are hereinafter explained.

Before proceeding to the description of the signal conversion circuits 70 and 80, an example of the transmission standard for digital signals used in the present embodiment is explained.

In the present embodiment, the so-called IEEE 1394 standard by the Institute of Electrical and Electronics Engineers (IEEE) is explained as the transmission standard for digital signals. Meanwhile, IEEE1394 standard is stirring up notice as being suited to multimedia applications such as connection between household electronics equipments, such as digital video recorders, or connection between these electronics equipments and a computer.

Nowadays, there are going on the activities for formulating protocol standards of a bridge interconnecting the buses used in IEEE1394 high speed serial bus communication environment by P1394.1 (bridge) working group, with the up-to-data draft being p1394.1 Draft 0.03 Oct. 18, 1997. The IEEE1394 bridge, referred to below simply as the bridges constituted by a set of equipments (nodes) termed portals connected to the IEEE 1394 serial bus. Data transmission can be made via IEEE 1394 bridge across two or more buses. Although the number of equipments connected to the IEEE 1394 serial bus is limited to 53 at the maximum, a larger number of nodes can be interconnected by interconnecting plural buses using the bridge and by constructing a network comprised of the bus and the bridge. It is already proposed to transmit data by the above-mentioned bridge (across the portals) not only by a cable but also by infrared rays. The radio communication by the infrared rays in the present embodiment can be applied to the communication across the portals constituting the bridge.

Figure 14:
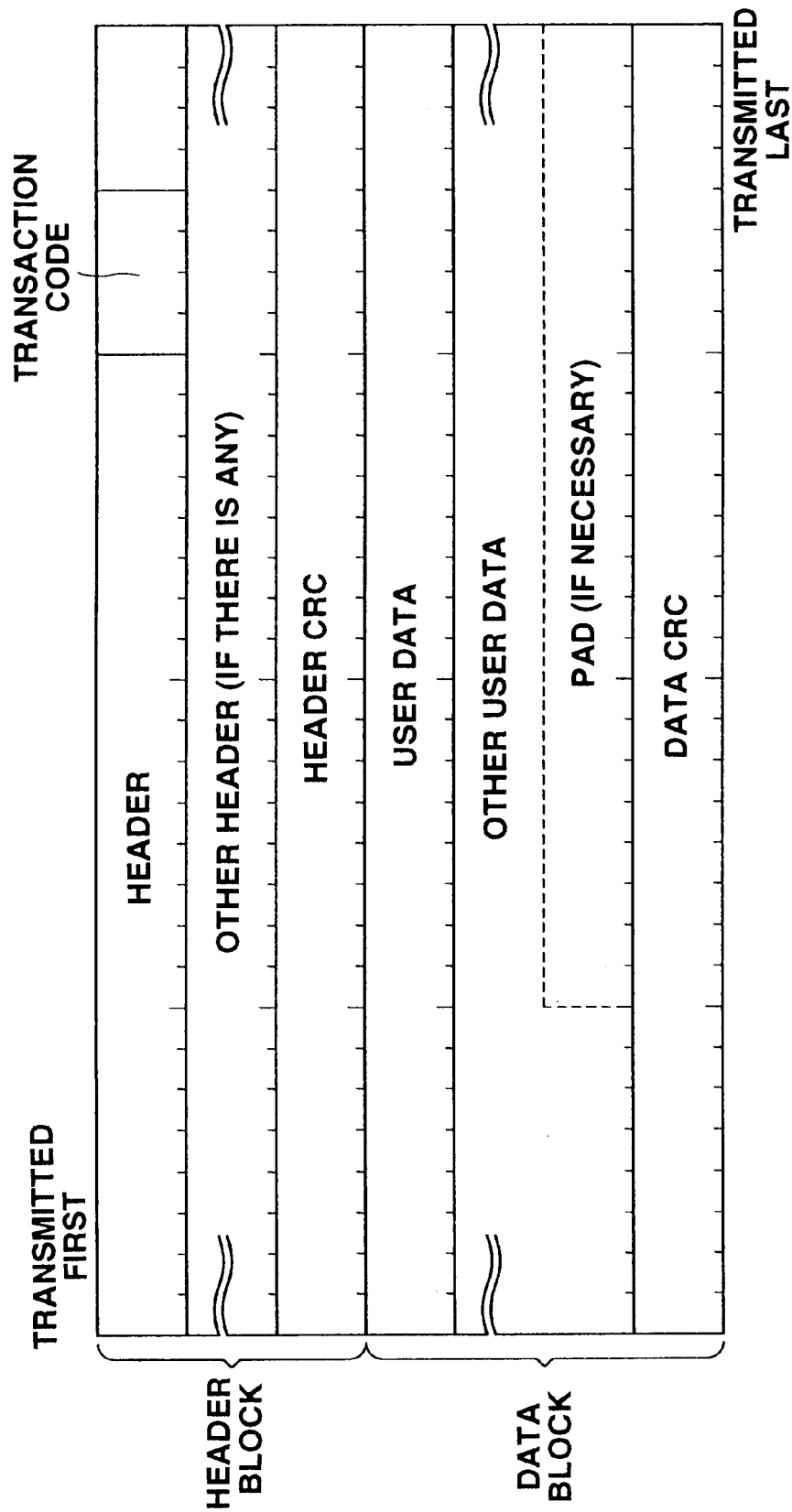
FIG. 14 shows the basic format of a packet of the IEEE 1394 standard.
Figure 15:
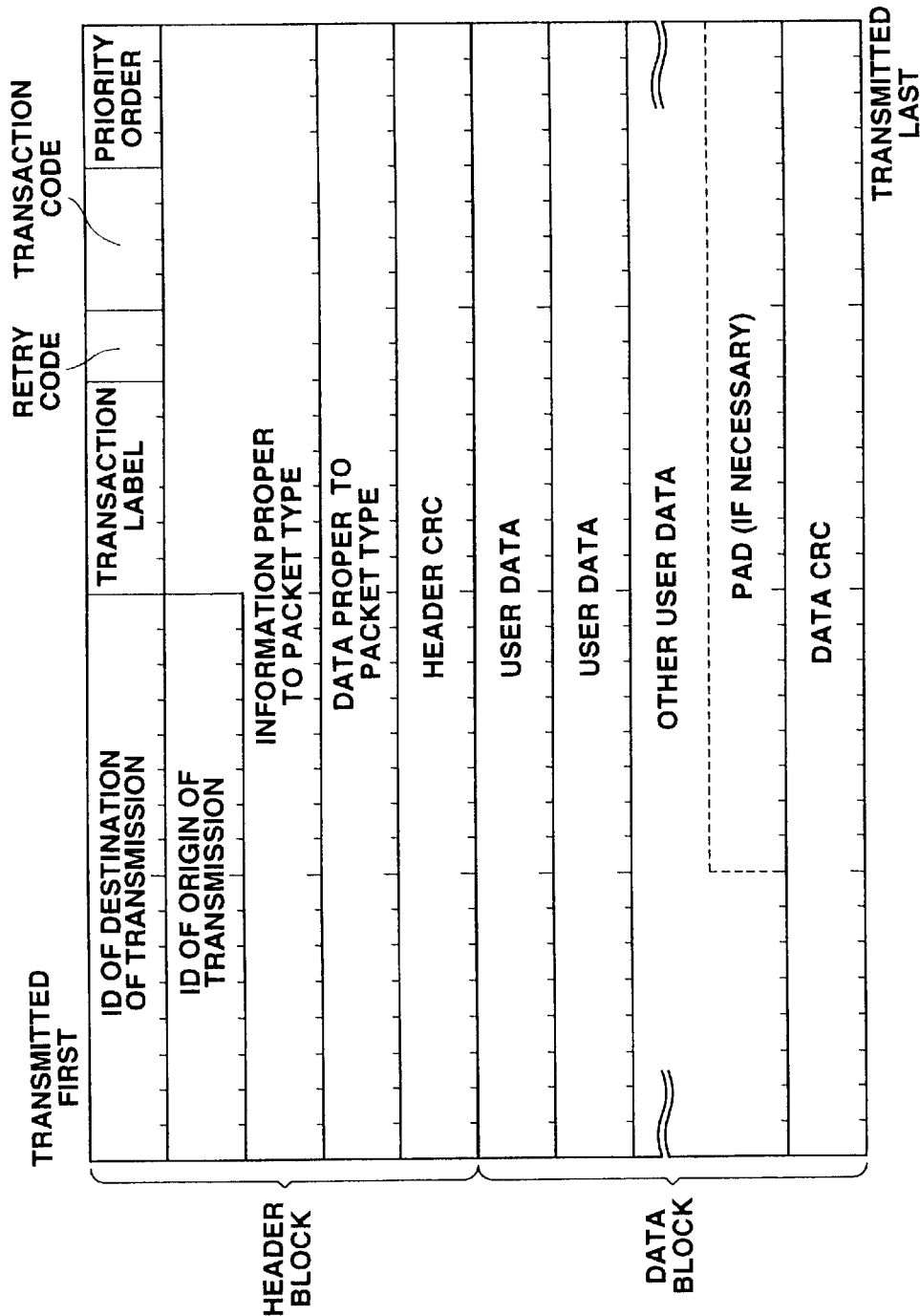
FIG. 15 shows the data format of an asynchronous packet of the IEEE 1394 standard.
Figure 16:
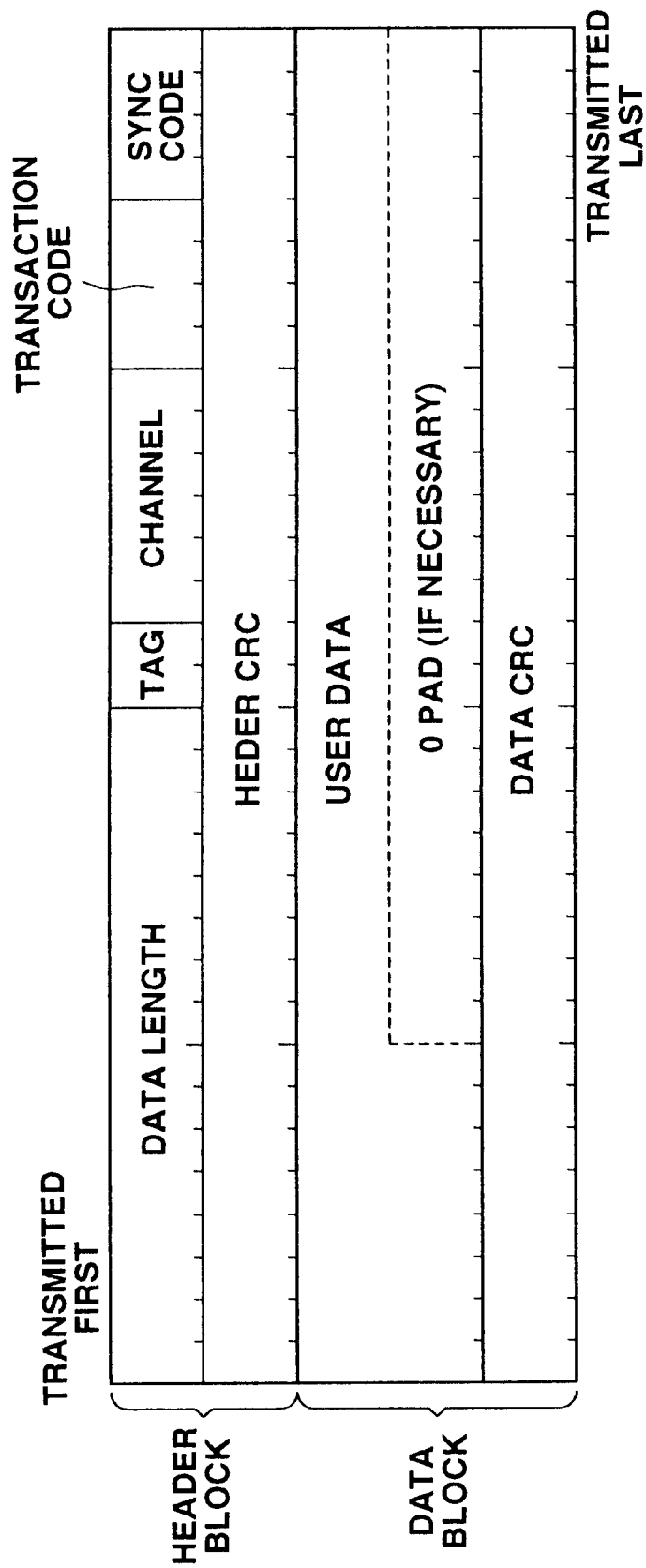
FIG. 16 shows the data format of an isochronous packet of the IEEE 1394 standard.
Figure 17:
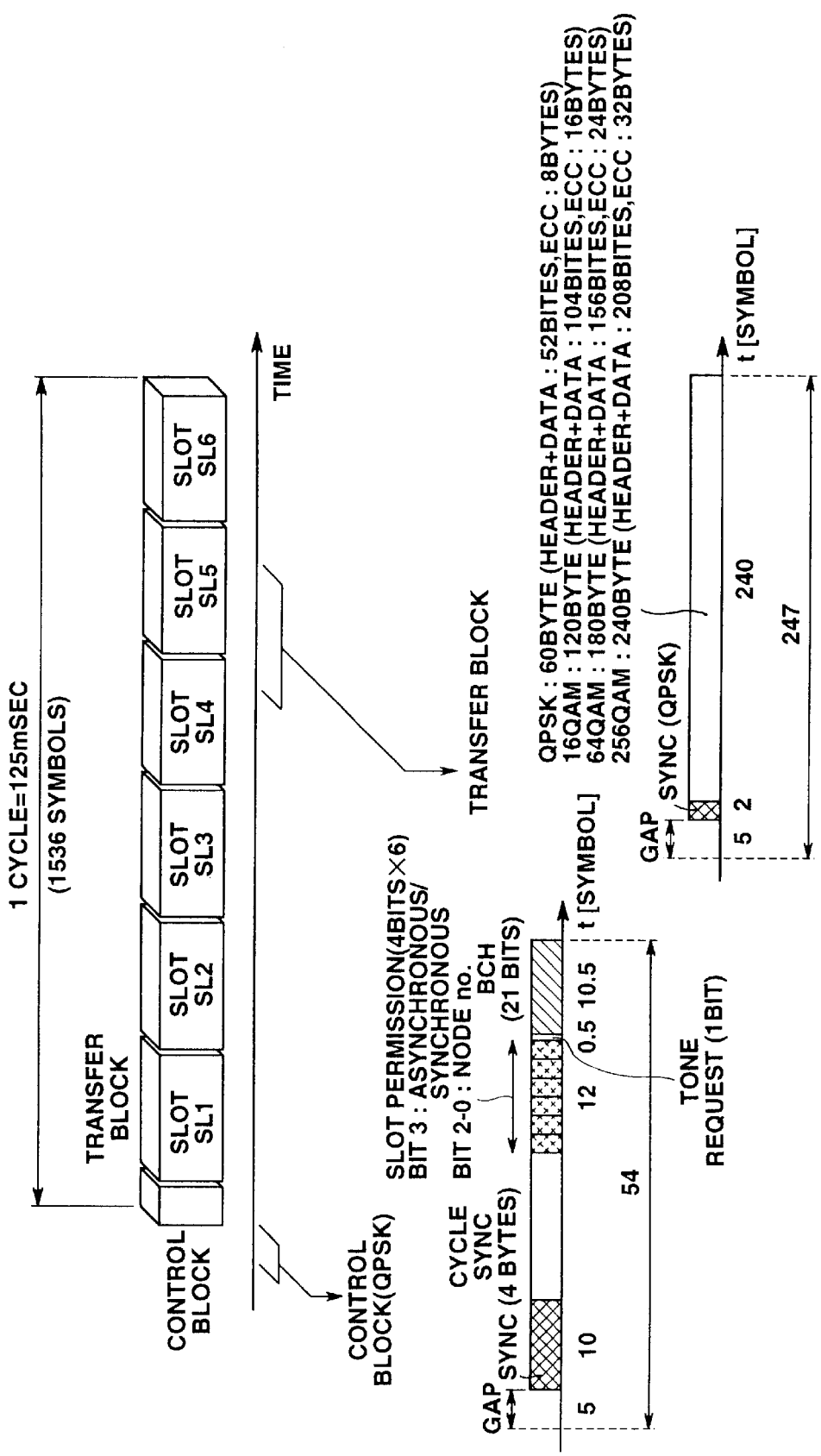
FIG. 17 shows the data format of radio communication employing infrared rays.

The data structure (format) in case of the radio communication by the infrared rays and the data structure (format) in case of the data communication in accordance with the IEEE 1394 standard are as shown in FIGS. 14 to 17. Meanwhile, FIGS. 14 to 16 show the data format in case of data communication in accordance with the IEEE 1394 standard, while FIG. 17 shows the data format in case of infrared communication.

The data format for data communication in accordance with the IEEE 1394 standard, that is the basic format of the packet, is roughly made up of a header, transaction code (t-code), header CRC, user data and data CRC, as shown in FIG. 14. The header CRC is calculated on the basis only of the header of the packet in question. In the IEEE 1394 standard, it is provided that a node should not execute an action or make a response to a header having a packet header not passing the check of the header CRC. It is also provided that the header should contain the transaction code which defines the packet type of major packets. The IEEE 1394 standard also provides that the header has to contain a transaction code which defines the packet type of the major packets. In the IEEE 1394 standard, an asynchronous packet and aisochronous packet are derived from the packet shown in FIG. 14 and are distinguished form each other by the values of the transaction codes.

The format of the asynchronous packets is prescribed as shown in FIG. 15. In the format for the asynchronous packet, shown in FIG. 11, the header is made up of an identifier of a node of the source of transmission (destination$_{13}$ ID), transaction level (tl), transaction code (tcode), retry code (rt), priority sequence information (pri), identifier of the transmission source node (source ID), information proper to the packet type (destination$_{13}$ offset, rcode, reserved), data proper to the packet type (quadlet$_{13}$ data, data$_{13}$ length, extended$_{13}$ tcode) and the header CRC.

The format of the isochronous packet is prescribed as shown in FIG. 16. In the format of the isochronous packet, shown in FIG. 16, the header is made up of data length (data$_{13}$ length), format tag of aisochronous data (tag), aisochronous channel (channel), transaction code (tcode), synchronization code (sy) and the header CRC.

Figure 2:
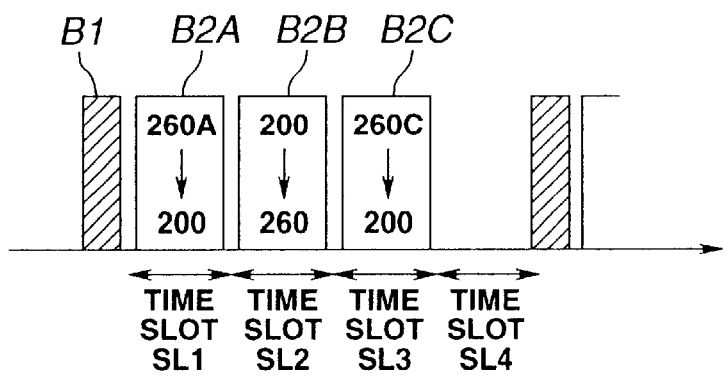
FIG. 2 shows time allocation of the communication network by infrared rays.

On the other hand, the data format for communication by infrared rays is as shown in FIG. 17, which shows details of FIG. 2.

Referring to FIG. 17, the control block is roughly made up of a sync area, a cycle sync area, a slot permission area and a tone request area. The transfer block is made up of a sync area and a data area which is made up of a header and user data. The data of the above-mentioned IEEE 1394 standard are arranged as user data of the transfer block.

In the above-mentioned IEEE 1394 standard, data is transmitted in terms of the packet as a unit. In a well-known manner, the packet data are of variable length. On the other hand, the transmitting/receiving unit in the radio communication by the infrared rays is of a fixed-length frame.

Figure 18:
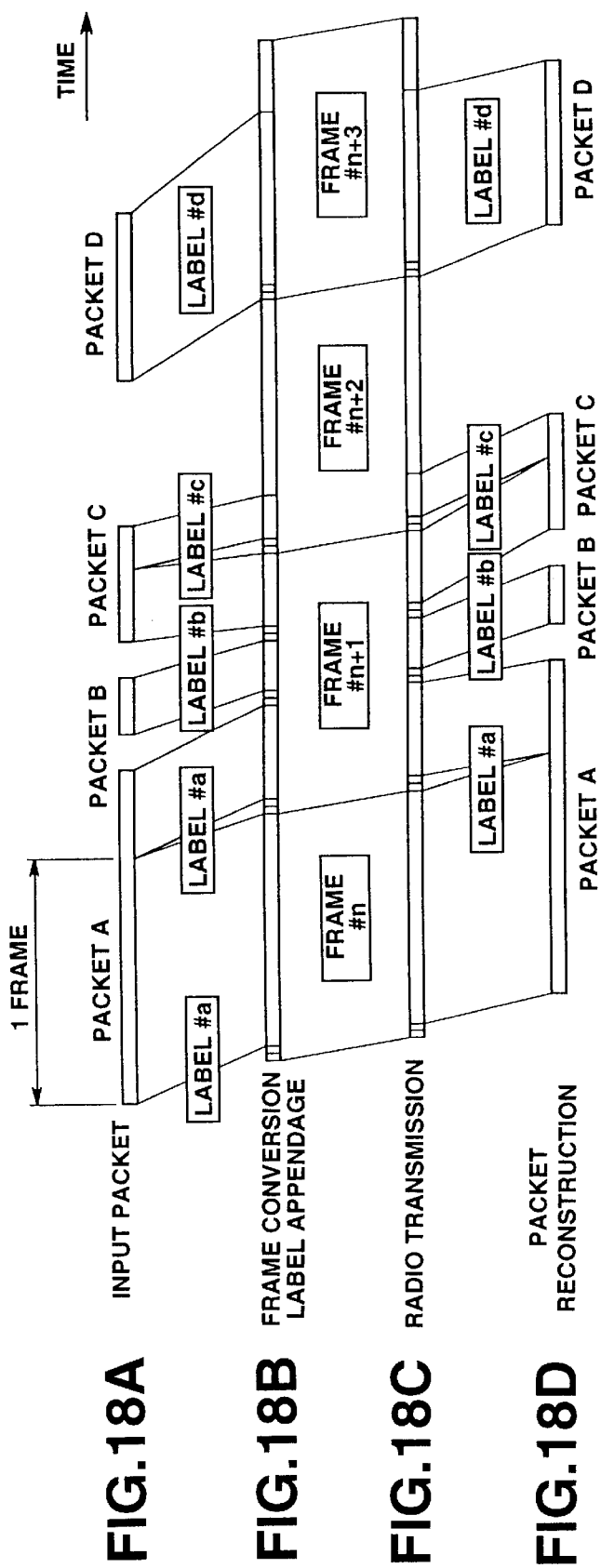
FIG. 18 illustrates frame conversion and packet re-construction at the time of transmitting/receiving packets as data transmitting/receiving unit of the IEEE 1394 standard with a frame as data transmitting/receiving unit in radio communication by infrared rays.

To this end, the processing shown in FIG. 18 is carried out in case of transmitting/receiving data of IEEE 1394 standard by radio communications of infrared rays.

That is, if the packet A of the variable length is longer than each frame of the fixed length, as shown in FIG. 18A, the transmitting side appends the label #a, comprised of a packet ID for discrimination and the splitting information, to the packet A in question, splits the resulting data into plural sections, distributes the data of the packet A along with the label #a to respective frames and transmits the resulting data in the order of the packet data, as shown in FIGS. 18B and 18C. The reception side couples the split data having the same packet ID in the sequence of reception, based on the appended label #a, as shown in FIG. 18D, to regenerate the original packet A.

If, as shown in FIG. 18A, the packet length is shorter than the frame length, as in the case of packets B and C, zero data is appended to the trailing end of the data, and the discriminating label #c for the packet C (label #b for the packet B) is also appended, until the packet length is equal to the fixed frame length, as in the case of the packet C. Alternatively, labels #c, #b are attached to a portion of plural packets C and to the packet B, these packets B, C being assembled into a frame along with respective labels #b, #c and transmitted, as shown in FIGS. 18B and 18C. The receiving side individually regenerates the packets, based on the appended labels #b and #c, to regenerate the original packets B and C, as shown in FIG. 18D.

By carrying out the processing such as splitting or integration of the packet data in this manner, the packets of variable lengths can be transferred easily without waste even though the respective frames are of fixed lengths.

The communication networks of the present embodiments of the present invention, as described above, are provided with signal conversion circuits 70 and 80 for conversion of the communication data format of the IEEE 1394 standard and the data format of the communication network by the infrared rays.

Figure 19:
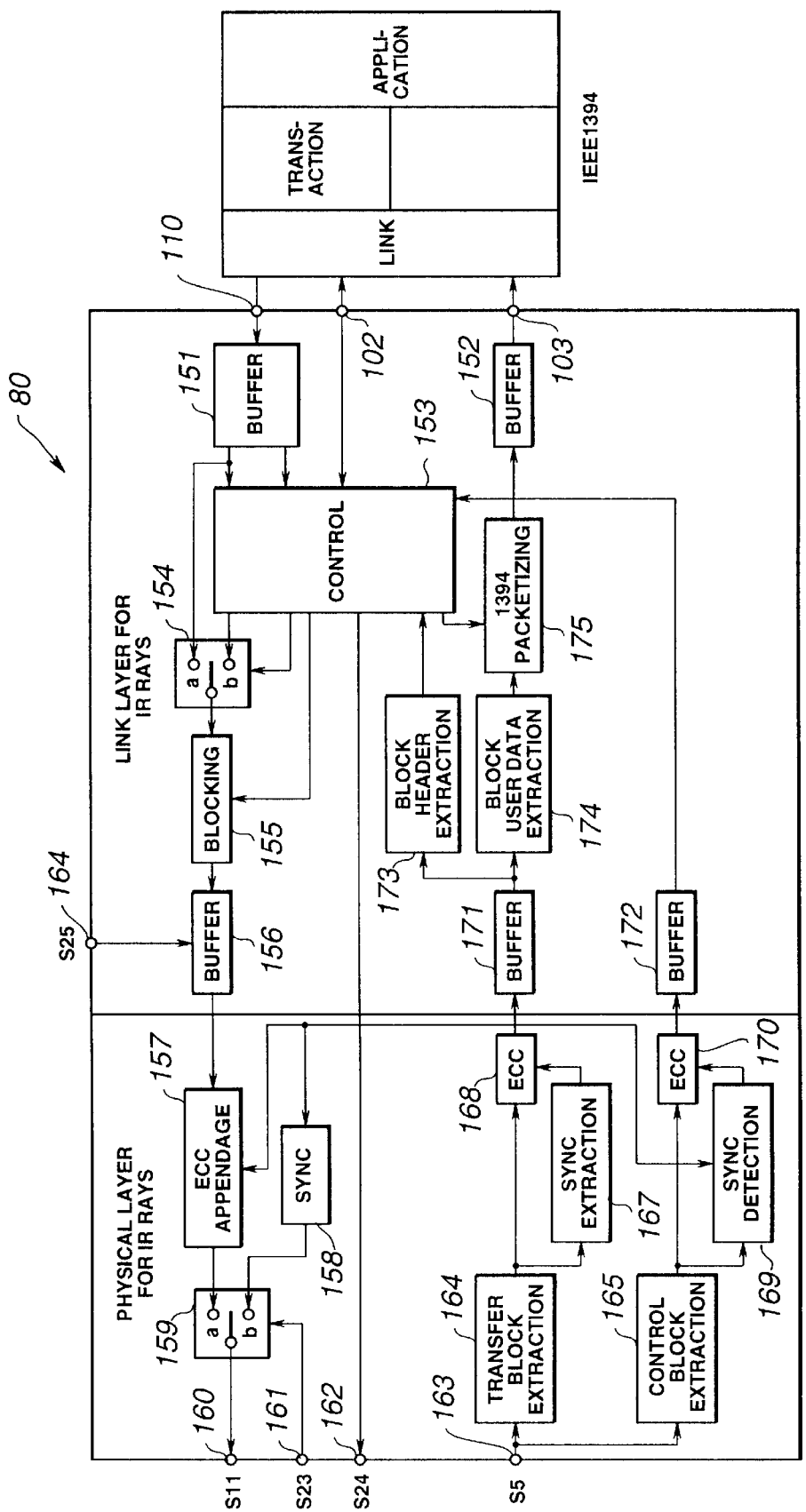
FIG. 19 is a block circuit diagram showing a specified illustrative structure of a signal conversion circuit of a controlled node in each of the embodiments.

FIG. 19 shows a specified structure of the signal conversion circuit 80 provided in the controlled node 100.

In FIG. 19, the aforementioned IEEE 1394 packet data is inputted to a terminal 101, while the IEEE 1394 packet data are outputted at a terminal 103. At a terminal 102, control data such as cycle sync or the data volume information is transmitted/received between the IEEE1394 level and the level of the radio communication by infrared rays. At a terminal 160, the transmitted signal S11 is outputted from a terminal 160 and sent to the orthogonal modulation circuit 41 of the transmitter 40. To a terminal 161, there is fed a changeover control signal S23 for a switch 159, as later explained, from the controller 60. To a terminal 163, there is sent a reception signal S5 from the orthogonal demodulation circuit 52 of the receiver 50 and, to a terminal 164, there is sent a buffer control signal S25 from the controller 60.

A reception signal S5, sent to the terminal 163, is fed to a transfer block extraction circuit 164 and to a control block extraction circuit 165. The transfer block extraction circuit 164 extracts the transfer block from the reception signal S5, while the control block extraction circuit 165 extracts the control block from the reception signal S5.

The transfer block extracted from the reception signal S5 by the transfer block extraction circuit 164 is sent to a sync detection circuit 167 and to an ECC circuit 168. The sync detection circuit 167 detects the sync of the transfer block and synchronizes the ECC circuit 168 based on the detected sync. The ECC circuit 168 corrects errors using the error correction code (ECC) appended the transfer block.

The transfer block, corrected for errors by the ECC circuit 168, is stored in a pre-set volume in a buffer memory and is then read from the buffer memory 171, so as to be sent to a block header extraction circuit 173 and to a block user data extraction circuit 174. The block header extraction circuit 173 extracts the header of the transfer block, while the block user data extraction circuit 174 extracts user data in the transfer block.

The header is sent to a controller 153, while the user data is sent to a 1394 packetizing circuit 175. This 1394 packetizing circuit 175 packetizes the user data into IEEE 1394 packet data, under control by a controller 153, to send the packet data to the buffer memory 152, which then stores a pre-set volume of the packet data and subsequently reads out the packet data to output the read-out packet data from the terminal 103 to the IEEE 1394 level.

The control block extracted by the control block extraction circuit 165 from the reception signal S5 is sent to a sync detection circuit 169 and to an ECC circuit 170. The sync detection circuit 169 detects the sync of the control block to synchronize the ECC circuit 170 and a sync generating circuit 158 and an ECC appending circuit 157 as later explained based on the detected sync. The ECC circuit 170 corrects errors using the error correction code (ECC) attached to the control block.

The control block, corrected for errors by the ECC circuit 170, is stored in a pre-set volume in a buffer memory and is then read from the buffer memory 171, so as to be sent to the controller 153.

The controller 153 views the control block, supplied thereto, and checks for the possible presence of the use permission and the slot in use, as described above. The use permission signal S24, retrieved from the control block by the controller 153, is sent from the terminal 162 to the controller 160.

The IEEE 1394 packet data, supplied to the terminal 101, is stored in a pre-set volume in a buffer memory and is then read from the buffer memory 171, so as to be sent to a fixed terminal a of a switch 154 and to the controller 153. The buffer memory 151 also outputs the data volume information of the buffer memory, that is the buffer volume monitoring data, which also is fed to the controller 153. The controller 153 generates pseudo IEEE 1394 packet data from the IEEE 1394 packet data, while generating the changeover control signal for the switch 154 and the header information of the block for the infrared rays.

The pseudo IEEE 1394 packet data is sent to a fixed terminal b of the switch 154. The changeover control signal and the header information are sent to the switch 154 and to a blocking circuit 155, respectively. The switch 154 is responsive to the changeover control signal from the controller 153 to switch between the IEEE 1394 packet data at the fixed terminal a and the pseudo IEEE 1394 packet data at the fixed terminal b to output the selected data. This data from the switch 154 is sent to the blocking circuit 155. The blocking circuit 155 then appends the header information generated by the controller 153 to the leading end of the data from the switch 154 to construct a block for infrared rays, which is outputted.

The block outputted by the blocking circuit 155, and is sent to an ECC appendage circuit 157. The buffer memory 156 has its storage and readout controlled by a buffer control signal S25 from the controller 60. The ECC appending circuit 157 operates on the basis of the synchronization signal from the sync detection circuit 169 to append the error correction code (ECC) to the block.

The block having the ECC attached thereto by the ECC appending circuit 157 is sent to the fixed terminal a of the switch 159. To the fixed terminal b of the switch 159 is fed the sync generated by the sync generating circuit 158 on the basis of the synchronization signal from the sync detection circuit 169. The switch 159 has its switching operation controlled by the controller 60 via terminal 161. From this switch 159 is outputted the black having the sync attached thereto.

The block, having the sync attached thereto, is sent from the terminal 160 to the orthogonal modulation circuit 41 of the transmitter 40 as the above-mentioned transmission signal S11 from which is derived the transfer block used for radio communication by the infrared rays.

Figure 20:
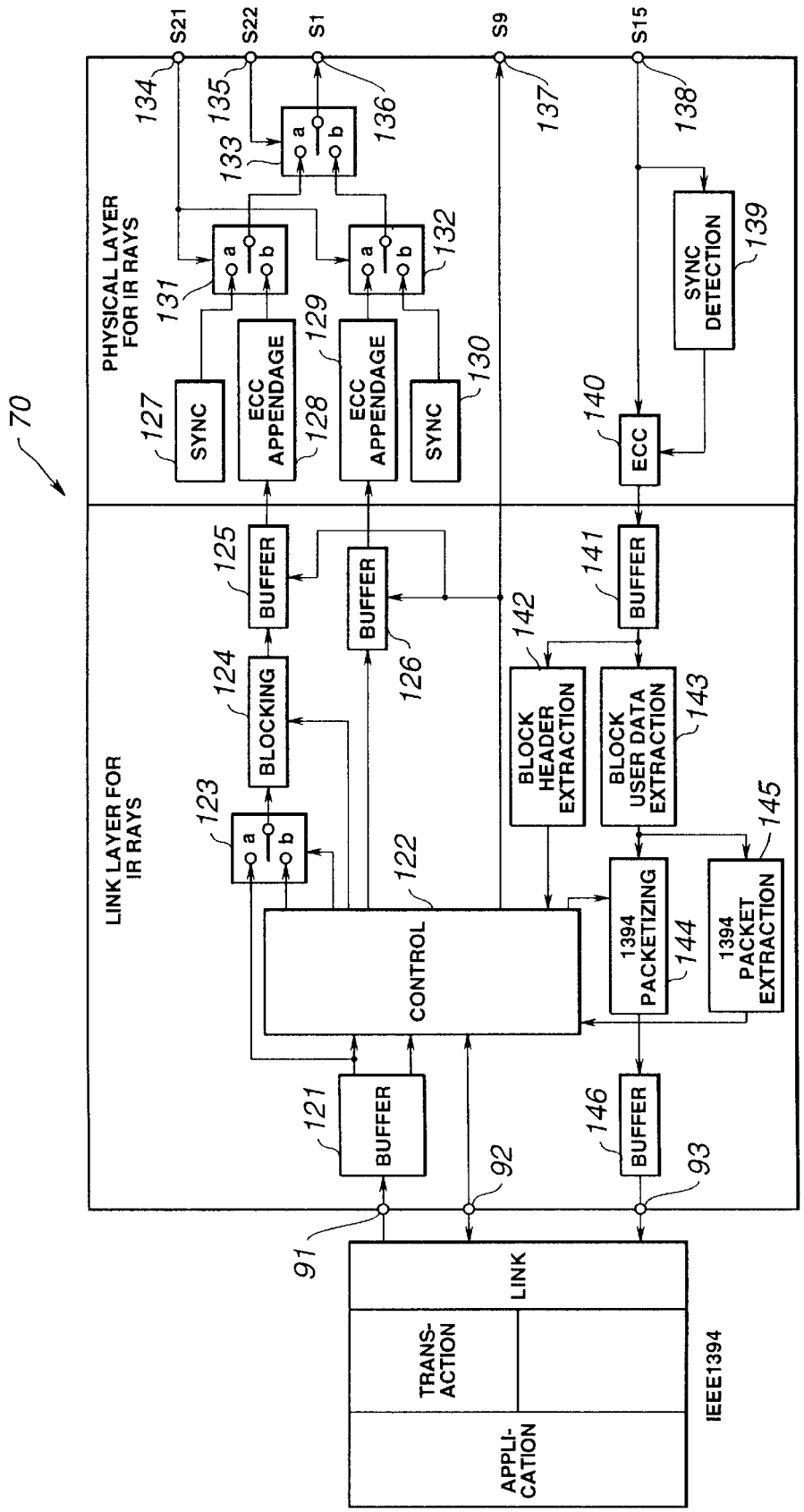
FIG. 20 shows an illustrative structure of a signal conversion circuit of a control node in each of the embodiments.

FIG. 20 shows a specified structure of the signal conversion circuit 70 provided in the control node 90.

In FIG. 20, the IEEE 1394 packet data is inputted to a terminal 91, and the IEEE 1394 packet data is outputted from a terminal 93. At a terminal 92, the control data, such as the cycle sync or the data volume information, is transmitted/received between the IEEE 1394 level and the radio communication level by infrared rays. From a terminal 136, the signal S1 of the transfer block or the control block is outputted and sent to the fixed terminal b of the switch 31. To terminals 134, 135 are sent changeover control signals S21 and S22 of switches 131 to 133, as later explained, from the controller 30. To a terminal 138 is sent a reception signal S15 from the orthogonal demodulation circuit 22 of the receiver 20. From a terminal 137 is outputted a command S9 received from the controller 122, such as an upper layer, and is sent to the controller 30.

The reception signal S15, sent to the terminal 138, is sent to a sync detection circuit 139 and to an ECC circuit 140. The sync detection circuit 139 detects the sync of the reception signal S15 to synchronize the ECC circuit 140 based on the detected sync. The ECC circuit 140 corrects errors using the error correction code (ECC) attached to the reception signal S15.

The reception signal S15, corrected for errors in the ECC circuit 140, is stored in a pre-set amount in the buffer memory 141 and is then read out therefrom and sent to a block header extraction circuit 142 and to a block user data extraction circuit 143. The block header extraction circuit 142 extracts user data in the reception signal S15.

The header is sent to the controller 122, while the user data is sent to the 1394 packetizing circuit 144 and to a pseudo 1394 packet extraction circuit 145. The 1394 packetizing circuit 144 packetizes the user data into IEEE 1394 packet data, under control by the controller 122, to send the packet data to a buffer memory 146. The pseudo 1394 packet extraction circuit 145 extracts the pseudo IEEE 1394 packet to send the extracted packet to the controller 122. The buffer memory 146 stores a pre-set volume of the packet data and subsequently reads out the stored packet data to output the data from terminal 93 to the IEEE 1394 level.

The IEEE 1394 packet data, sent to terminal 91, is stored in a pre-set amount in a buffer memory 121 and subsequently read out and supplied to the fixed terminal a of the switch 123 and to the controller 122. The data volume information in the buffer memory 121, that is the buffer volume monitoring data, is outputted by the buffer memory 121 and sent to the controller 122. The controller 122 generates the pseudo IEEE 1394 packet data from the IEEE 1394 packet data, while generating the changeover control signal for the switch 123 and the header information of the block for infrared rays. The controller 122 also outputs the cycle sync of the control block, slot permission and tone request etc, while outputting a command S9 received from the upper layer etc of IEEE 1394.

The pseudo IEEE 1394 packet data is sent to the fixed terminal b of the switch 123. The changeover control signal and the header information are sent to the switch 123 and to the blocking circuit 124, respectively. The switch 123 is responsive to the changeover control signal from the controller 122 to switch between the IEEE 1394 packet data from the fixed terminal a and the pseudo IEEE 1394 packet data from the fixed terminal b to output the selected data. The output data of the switch 123 is sent to a blocking circuit 124, which then appends the header information generated by the controller 122 to the leading end of the data from the switch 123 to construct a block for infrared rays, which is outputted. For the control node 90, the switch 123 is not absolutely necessary, while the controller 122 is not necessarily in need of generating the pseudo IEEE 1394 packet data. In this case, the IEEE 1394 packet data is directly sent to the blocking circuit 124.

The output block of the blocking circuit 124 is stored in a pre-set amount in a buffer memory 125, having its storage and readout controlled on the basis of the command S9 from the upper layer etc, and is subsequently read out therefrom and sent to an ECC appendage circuit 128 for appendage of the error correction code ECC to the block.

The block, to which the ECC is attached by the ECC appendage circuit 128, is sent to the fixed terminal a of the switch 131, to the fixed terminal b of which the sync generated by a sync generating circuit 127 is supplied. The switch 131 is changeover-controlled by the changeover control signal S21 from the terminal 134 and outputs the block having the sync appended thereto.

Output signals of the controller 122, such as the cycle sync, slot permission or tone request of the control block, are stored in a pre-set amount in the buffer memory 126 having its storage and readout controlled on the basis of the command S9 from the upper layer etc, and is subsequently read out therefrom and to an ECC appendage circuit 129 for appendage of the error correction code ECC to the signals from the buffer memory 126.

The signals with the appended ECC from the ECC appendage circuit 129 are sent to the fixed terminal a of the switch 132, to the fixed terminal b of which is supplied the sync generated by a sync generating circuit 130. The switch 132 is changeover-controlled by the changeover control signal S21 from the terminal 134 and outputs the block having the sync appended thereto.

The block from the switch 131 and the signal from the switch 132 are sent to the fixed terminals a and b of the switch 133, respectively. The switch 133 is changeover-controlled by the changeover control signal S22 from the terminal 135, and the signal selected by the switch 133 is sent via terminal 136 to the switch 31 as the transmission signal S1.

What is claimed is:

1. An optical communication method used in a communication network in which communication is had between a control node and a number of controlled nodes using light rays amplitude-modulated by a carrier modulation signals of a first pre-set frequency range, comprising:

a step of transmitting a transmission permission signal from the control node to each controlled node; and a step of starting or interrupting light emission of the light rays from a light emission circuit with desired transient characteristics by each controlled node having reference to said transmission permission signal, whereby the transmission permission signal (i) informs the respective controlled node as to when transmission of the light rays is to start or stop and (ii) enables the light emission circuit of a respective controlled node to be activated or deactivated, and wherein said desired transient characteristics are such that frequency components generated on starting or interrupting the emission of the light rays by said controlled node are not generated in a frequency range of approximately 33 kHz to 6 MHz.

2. The optical communication method according to claim 1 wherein the transmission timing of a transmission permission signal transmitted by said control node to each controlled node at least includes time delay corresponding to the time which elapses since start of light emission by the transmission-permitted controlled node with said desired transient characteristics until the controlled node reaches the actually transmission enabled state.

3. The optical communication method according to claim 1 wherein light emission is started or interrupted with said desired transient characteristics even in the control node and wherein said desired transient characteristics are such that light emission is started directly before transmission by said control node and the controlled node and such that light emission is interrupted directly following transmission by said control node and the controlled node.

4. The optical communication method according to claim 1 wherein said frequency components generated on starting or interrupting the emission of the light rays by said controlled node are generated in a frequency range not less than 6 MHz.

5. The optical communication method according to claim 1 wherein said light rays are infrared rays.

6. An optical communication apparatus used in a communication network doing communication with light rays amplitude-modulated by a carrier modulation signal of a first pre-set frequency range, comprising:

inputting means for inputting a transmission permission signal transmitted by a node connected to said communication network; and light emission control means for starting or interrupting emission of said light rays from a light emission circuit at desired transient characteristics by having reference to the transmitted transmission permission signal, whereby the transmission permission signal (i) informs a controlled node as to when transmission of the light rays is to start or stop and (ii) enables the light emission circuit of a respective controlled node to be activated or deactivated, and wherein said desired transient characteristics are such that frequency components generated on starting or interrupting the emission of the light rays by said controlled node are not generated in a frequency range of approximately 33 kHz to 6 MHz.

7. The optical communication apparatus according to claim 6 wherein the transmission timing of the transmission permission signal at least includes time delay corresponding to the time which elapses since start of light emission with said desired transient characteristics until the controlled node reaches the actually transmission enabling state.

8. The optical communication apparatus according to claim 6 wherein said desired transient characteristics are such characteristics in which emission of said light rays is started directly before transmission or interrupted directly after transmission.

9. The optical communication apparatus according to claim 6 wherein said frequency components generated on starting or interrupting the emission of the light rays by said controlled node are generated in a frequency range not less than 6 MHz.

10. The optical communication apparatus according to claim 6 wherein said light rays are infrared rays.

11. An optical communication apparatus used in a communication network in which communication is had between a control node and a number of controlled nodes using light rays amplitude-modulated by a carrier modulation signals of a first pre-set frequency range, wherein:

said control node at least includes transmission permission signal transmitting means for transmitting a transmission permission signal to each controlled node; and wherein each controlled node has at least light emission control means for starting or interrupting emission of the light rays from a light emission circuit with desired transient characteristics by having reference to said transmission permission signal, whereby the transmission permission signal (i) informs the respective controlled node as to when transmission of the light rays is to start or stop and (ii) enables the light emission circuit of a respective controlled node to be activated or deactivated, and wherein said desired transient characteristics are such that frequency components generated on starting or interrupting the emission of the light rays by said controlled node are not generated in a frequency range of approximately 33 kHz to 6 MHz.

12. The optical communication method according to claim 11 wherein the transmission timing of the transmission permission signal transmitted by said control node to each controlled node at least includes time delay corresponding to the time which elapses since start of light emission by the transmission-permitted controlled node with said desired transient characteristics until the controlled node reaches the actually transmission enabling state.

13. The optical communication method according to claim 11 wherein there is provided light emission control means for starting or interrupting light emission with said desired transient characteristics even in the control node and wherein said desired transient characteristics are such characteristics in which light emission is started directly before transmission by said control node and the controlled node and in which light emission is interrupted directly following transmission by said control node and the controlled node.

14. The optical communication method according to claim 11 wherein said frequency components generated on starting or interrupting the emission of the light rays by said controlled node are generated in a frequency range not less than 6 MHz.

15. The optical communication method according to claim 11 wherein said light rays are infrared rays.

* * * * *